United States Patent

Joglekar

(10) Patent No.: US 9,123,107 B2
(45) Date of Patent: Sep. 1, 2015

(54) IMAGE-BASED ANALYSIS OF IMPLANTABLE MEDICAL DEVICE POSITIONING

(75) Inventor: Ajinkya M. Joglekar, Maple Grove, MN (US)

(73) Assignee: Medtronic, Inc., Minneapolis, MN (US)

( * ) Notice: Subject to any disclaimer, the term of this patent is extended or adjusted under 35 U.S.C. 154(b) by 450 days.

(21) Appl. No.: 13/447,427

(22) Filed: Apr. 16, 2012

(65) Prior Publication Data

US 2012/0275670 A1 Nov. 1, 2012

Related U.S. Application Data

(60) Provisional application No. 61/480,019, filed on Apr. 28, 2011.

(51) Int. Cl.
*G06K 9/00* (2006.01)
*G06T 7/00* (2006.01)

(52) U.S. Cl.
CPC ........ *G06T 7/0028* (2013.01); *G06K 2209/057* (2013.01); *G06T 2207/10121* (2013.01); *G06T 2207/20101* (2013.01); *G06T 2207/30021* (2013.01)

(58) Field of Classification Search
CPC .............. G06K 2209/057; G06T 2207/10121; G06T 2207/20101; G06T 2207/30021; G06T 7/0028
USPC ........................................................ 382/128
See application file for complete search history.

(56) References Cited

U.S. PATENT DOCUMENTS

| 6,445,952 | B1 | 9/2002 | Manrodt et al. |
| 6,807,439 | B2 | 10/2004 | Edwards et al. |
| 6,993,384 | B2 | 1/2006 | Bradley et al. |
| 7,346,382 | B2 | 3/2008 | McIntyre |
| 8,140,157 | B2 * | 3/2012 | Holmstrom ..................... 607/17 |
| 2003/0013977 | A1 * | 1/2003 | Daum ........................... 600/508 |
| 2008/0064947 | A1 | 3/2008 | Heruth |
| 2009/0196471 | A1 | 8/2009 | Goetz et al. |
| 2009/0198306 | A1 | 8/2009 | Goetz et al. |
| 2010/0135553 | A1 | 6/2010 | Joglekar |
| 2010/0157041 | A1 * | 6/2010 | Klaiman et al. ................. 348/77 |
| 2011/0093051 | A1 * | 4/2011 | Davis et al. ................... 607/116 |

OTHER PUBLICATIONS

Mirzaalian, et al., "Spatial Normalization of Human Back Images for Dermatological Studies" ftp://fas.sfu.ca/pub/cs/TR/2010/CMPT2010-01.pdf, published Feb. 3, 2010.

* cited by examiner

*Primary Examiner* — Tom Y Lu
(74) *Attorney, Agent, or Firm* — Shumaker & Sieffert, P.A.

(57) ABSTRACT

In general, aspects of this disclosure describe example techniques which may be used to identify lead migration or estimate dissemination of electrical stimulation therapy through tissue of a patient. For example, an image processing device may receive a selection of a segment in a first image of patient implanted with one or more leads. The image processing device may reconstruct the selected segment in the first image with a corresponding segment in a second image. With the reconstructed segment, a user or the image processing device may be able to identify lead migration or estimate dissemination of electrical stimulation therapy through tissue of the patient.

54 Claims, 13 Drawing Sheets

IMAGE-BASED ANALYSIS OF IMPLANTABLE MEDICAL DEVICE POSITIONING

This application claims the benefit of U.S. Provisional Application Ser. No. 61/480,019 filed Apr. 28, 2011 and entitled "IMAGE-BASED ANALYSIS OF IMPLANTABLE MEDICAL DEVICE POSITIONING," the content of which is incorporated herein by reference in its entirety.

TECHNICAL FIELD

This disclosure generally relates to implantable medical devices (IMDs) and, more particularly, to image-based analysis of IMD positioning in a patient.

BACKGROUND

Implantable medical devices (IMDs) may be used to deliver therapy to patient to treat a variety of symptoms or conditions such as chronic pain, tremor, Parkinson's disease, epilepsy depression, urinary or fecal incontinence, sexual dysfunction, obesity, or gastroparesis. For example, an IMD may deliver neurostimulation therapy via leads that include electrodes located proximate to the spinal cord, pelvic nerves, peripheral nerves, the stomach or other gastrointestinal organs, or within the brain of a patient. In general, the IMD may deliver electrical stimulation therapy in form of electrical signals such as pulses via one or more electrodes carried by one or more implantable leads.

In some instances, a medical professional such as a medical technician or a physician may take an image of the implanted leads, such as a fluoroscopic image of the implanted leads, for visual comparison with an image of the implanted leads taken during a subsequent patient visit. In some instances, the medical professional may utilize different imaging modalities to acquire images of the patient. For example, the medical profession may utilize a fluoroscopic imaging modality to acquire an image of the implanted leads, and a tensor imaging modality to acquire an image of the nerve fibers within the patient.

SUMMARY

In general, aspects of this disclosure are related to techniques for supporting comparisons between segments of at least a base image and a comparative image to analyze positioning of an implantable medical device (IMD), or portion thereof, within a patient. An image processing device, such as a medical device programmer for the IMD, may display the base image. A user such as a medical technician, physician, or patient may select a shape of a segment in the base image with the image processing device. In some examples, the image processing device may reconstruct the selected shape in the base image with a corresponding shape in the comparative image for comparisons between segments of the base image and the comparative image.

In one example, the disclosure is directed to a method comprising receiving a selection, with an image processing device, of a segment in a first image of a patient implanted with one or more leads of an implantable medical device. The method further comprising reconstructing, with the image processing device, the selected segment in the first image with a corresponding segment in a second image of the patient implanted with the one or more leads. In accordance with the method, the reconstructed segment is configured to show a relationship between the one or more leads displayed in the first image and the second image.

In another example, the disclosure is directed to a system comprising an apparatus. The apparatus comprises a user interface to receive a selection of a segment in a first image of a patient implanted with one or more leads of an implantable medical device. The apparatus also comprises processing circuitry configured to reconstruct the selected segment in the first image with a corresponding segment in a second image of the patient implanted with the one or more leads. In the system, the reconstructed segment is configured to show a relationship between the one or more leads displayed in the first image and the second image.

In another example, the disclosure is directed to a computer-readable storage medium comprising instructions. The instructions cause one or more processors in an image processing device to receive a selection of a segment in a first image of a patient implanted with one or more leads of an implantable medical device. The instructions also cause the one or more processors in the image processing device to reconstruct the selected segment in the first image with a corresponding segment in a second image of the patient implanted with the one or more leads. In this example, the reconstructed segment is configured to show a relationship between the one or more leads displayed in the first image and the second image.

In another example, the disclosure is directed to an apparatus. The apparatus comprises means for receiving a selection of a segment in a first image of a patient implanted with one or more leads of an implantable medical device. The apparatus also comprises means for reconstructing the selected segment in the first image with a corresponding segment in a second image of the patient implanted with the one or more leads. In the apparatus, the reconstructed segment is configured to show a relationship between the one or more leads displayed in the first image and the second image.

The details of one or more examples described in this disclosure are set forth in the accompanying drawings and the description below. Other features, objects, and advantages of the disclosure will be apparent from the description and drawings, and from the claims.

DETAILED DESCRIPTION

Figure 1:
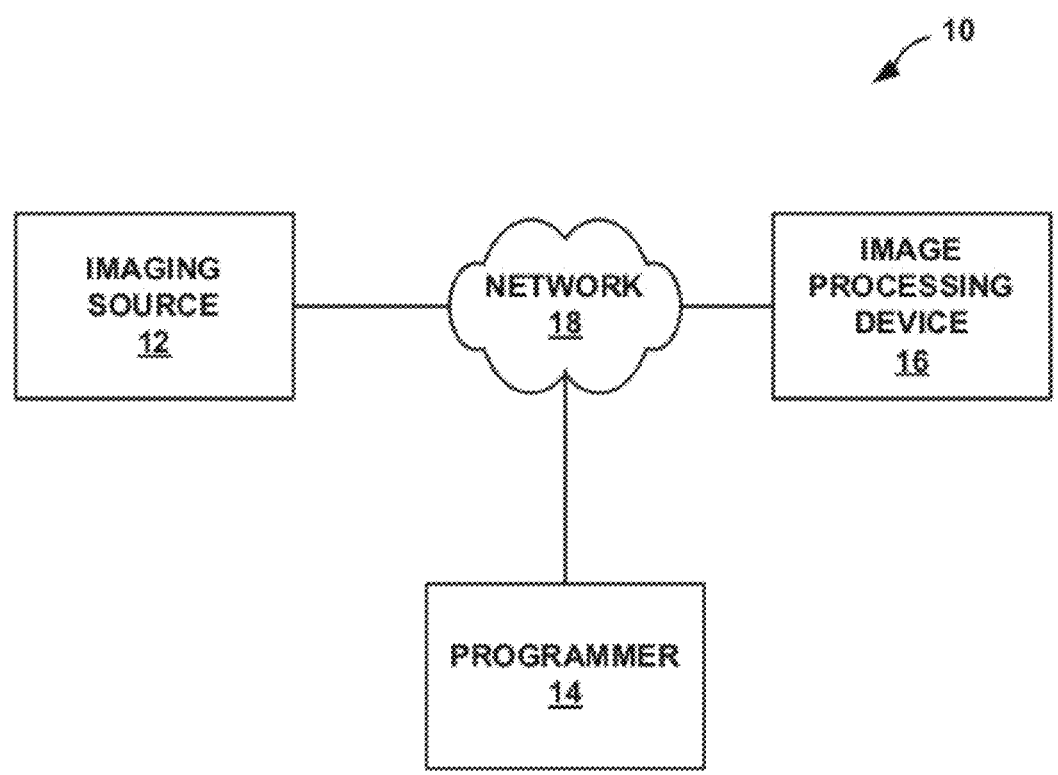
FIG. 1 is a block diagram illustrating an imaging system.

In some examples, an implantable medical device (IMD) may be coupled to one or more implantable leads implanted within a patient. The IMD may deliver electrical stimulation therapy via the implantable leads. For purposes of illustration, aspects of this disclosure are described in the context of electrical stimulation therapy. For instance, a user such as a medical technician or a physician, and in some examples, the patient, may select one or more parameters of the electrical stimulation therapy, e.g., one or more of pulse width, amplitude, and frequency, based at least in part on the implanted location of the leads and the patient anatomy surrounding the leads. However, aspects of this disclosure should not be considered limited to electrical stimulation therapy, and may be extended to other therapies, or generally to various applications where a user may consider it desirable to acquire images of the patient for comparative analysis of positioning of an IMD or a portion of an IMD within the patient.

For example, the user may determine the location of the one or more implanted leads associated with an implantable electrical stimulator by acquiring a base image of the patient. For example, the user may acquire the base image of the patient using a fluoroscopic imaging modality, although acquiring an image with other imaging modalities may be possible. An image processing device such as a medical device programmer for the IMD, as one example, may display the base image, e.g., the fluoroscopic image.

The fluoroscopic image may clearly display the location of the implanted leads. From the fluoroscopic image, the user may be able to program the parameters of the electrical stimulation therapy with the medical device programmer. In this example, the programmed parameters may be based at least in part on the location of the implanted leads as displayed in the fluoroscopic image.

The base image may indicate an implanted location of the leads, e.g., relative to one or more anatomical structures within the patient or other reference markers. However, it may be possible for one or more of the implanted leads to migrate from their implanted location. For example, normal patient movement (e.g., sitting, walking, or running), or physiological changes, may cause the implanted leads to migrate over time. This migration may reduce the efficacy of the electrical stimulation therapy. For instance, the programmed electrical stimulation therapy may have been optimized based on the implanted location of the leads. If the leads migrate, the programmed electrical stimulation therapy may no longer be optimal due to changes in relative positioning of electrodes relative to one another or relative to target tissue.

To identify lead migration, the user may take another, subsequent image (e.g., using the same imaging modality used to acquire the base image). This another, subsequent image may be referred to as a comparative image. For example, the user may acquire the base image with a fluoroscopic imaging modality shortly after lead implantation, and then acquire the comparative image with the fluoroscopic imaging modality during a subsequent patient visit to a clinic.

The user may then compare the base image with the comparative image to determine whether the leads have migrated. For example, the image processing device may display the base image and the comparative image side-by-side. The user may visually inspect the images to subjectively identify lead migration.

However, such subjective visual inspection may be imprecise, and may be insufficient to properly or precisely identify lead migration. For example, minor lead migration may not be noticeable to the user. As another example, the imaging modality or patient orientation during the base image and the comparative image may be different. In this instance, it may be difficult for the user to determine whether the differences between the base image and the comparative image are due to lead migration, or whether the differences between the base image and comparative image are due to the differences in imaging modality or patient orientations.

Aspects of this disclosure describe example techniques with which an image processing device may assist the user in comparing the base image and the comparative image to, as one example, identify lead migration. For example, a user may select a segment of the base image with the image processing device. To select the segment of the base image, the image processing device may provide the user with a visualizer. The visualizer may have a predefined or user-selected shape. The user may be able to move the visualizer along the base image presented on a display of the image processing device. The user may select the segment of the base image by moving the visualizer on top of the desired segment of the base image.

In some examples, the image processing device may reconstruct the selected segment of the base image with a corresponding segment from the comparative image. The corresponding segment in the comparative image may be a segment in the comparative image with substantially the same normalized coordinates as the selected segment. As one example, to reconstruct the selected segment of the base image, the image processing device may replace the selected segment of the base image with the corresponding segment in the comparative image. As another example, to reconstruct the selected segment of the base image, the image processing device may overlay the selected segment in the base image with the corresponding segment in the comparative image. In some examples, the image processing device may repeatedly reconstruct segments of the base image, encompassed by the visualizer, with corresponding segments in the comparative image as the user moves the visualizer along the base image.

The reconstruction of segments of the base image with corresponding segments of the comparative image may provide the user with a clearer understanding of whether the leads migrated. For example, as the user moves the visualizer along a lead in the base image, the image of the lead within the reconstructed segment would appear disjointed if there was lead migration, and would appear continuous if there was no lead migration. In this manner, reconstruction of segments of the base image may display lead migration which may not have been noticeable with a visual side-by-side comparison of the base image and the comparative image. Moreover, because the coordinates of the corresponding segment of the comparative image may be normalized with the coordinates of the base image, the examples described in this disclosure may be helpful in resolving discrepancies resulting from differences between imaging modality orientation or patient orientation in the base and comparative images.

For example, the reconstructed segment may show a relationship between the one or more leads displayed in the base image and the comparative image. For instance, in this example, the base image and the comparative image may both include an image of the leads implanted within the patient. The relationship shown by the reconstructed segment may comprise a relationship between a location of one or more leads displayed in the base image and a location of one or more corresponding leads displayed in the reconstructed segment, which may be from the comparative image.

The user may then modify parameters of the electrical stimulation therapy based on the comparison between the base image and the comparative image. For example, if the relationship shown by the reconstruction of a segment of the base image indicates substantial lead migration, the user may substantially modify the electrical stimulation therapy parameters to account for such lead migration. If the relationship shown by the reconstruction of a segment of the base image indicates minor lead migration, the user may be able to adjust the electrical stimulation therapy parameters to account for such lead migration, and thereby restore, maintain or improve therapeutic efficacy. In some instances, minor adjustments to the electrical stimulation therapy to address lead migration, which may not be visually noticeable, may improve the efficacy of the electrical stimulation therapy.

As another example, the image processing device may modify parameters of the electrical stimulation therapy, or recommend modification to the parameters, based on the comparison between the base image and the comparative image. For example, in examples where the image processing device comprises a medical device programmer, the medical device programmer may estimate the amount of migration. Based on the estimate, the medical device programmer may modify parameters of the electrical stimulation therapy, or recommend new parameters of the electrical stimulation therapy, to address the lead migration. The user may then modify the electrical stimulation therapy parameters based on the recommendation, or accept the modified electrical stimulation therapy parameters.

In some instances, the example techniques of this disclosure may enable a user to confirm whether the leads migrated. For example, a patient may indicate, during a subsequent visit, a reduction in the efficacy of the current therapy. To determine whether the reduction in the efficacy of the therapy is caused by lead migration, the user may acquire a comparative image, during the subsequent visit, move the visualizer along the base image to approximately the lead locations in the base image, and reconstruct the segment of the base image encompassed by the visualizer with the corresponding segment in the comparative image. The user may then determine whether the leads migrated, and if so, may conclude that the reduction in efficacy of the therapy may be potentially caused by the lead migration.

If, however, the user determines that the there is no lead migration, the user may conclude that the reduction in efficacy of the therapy may not be caused by lead migration, and that there may some other potential cause for the reduction in efficacy of the therapy. In this manner, the user may be able to better address patient needs, and potentially avoid modifying therapy parameters to account for lead migration, when no such lead migration exists.

Although the preceding examples describe the user moving the visualizer along the base image, aspects of this disclosure should not be considered so limiting. In an alternate example, rather than moving the visualizer along the base image, the user may move the visualizer along the comparative image. In this example, the image processing device may reconstruct segments of the comparative image with corresponding segments of the base image. The user may then modify the electrical stimulation therapy parameters based on the reconstruction of the segments of the comparative image. Hence, the terms "base image" and "comparative image" are relative, at least insofar as lead migration is to be detected, and are used to ease understanding. For present lead positioning, the comparative image will provide a more current view of the leads.

Furthermore, although the preceding examples illustrate techniques to identify lead migration, aspects of this disclosure are not so limited. In some examples, aspects of this disclosure may allow a user to compare images acquired with different imaging modalities. With such comparisons, the user may better understand how the electrical stimulation therapy disseminates through the patient's anatomy, which may assist the user in optimizing the electrical stimulation therapy parameters.

For instance, as described above, a fluoroscopic image may clearly display the implanted leads. However, the fluoroscopic image may not clearly display patient anatomy affected by the electrical stimulation therapy. For example, the fluoroscopic image may not display nerve fibers which carry the electrical stimulation therapy. Because the user cannot visualize the affected patient anatomy, it may be difficult for the user to determine how the electrical simulation therapy will affect the patient anatomy.

For instance, in examples where the image processing device comprises a medical device programmer, the medical device programmer may display the contours of an electric field generated by the leads for given electrical stimulation therapy parameters, e.g., may display how the stimulation is fractionalized. However, because the user cannot visualize the nerve fibers, the user may not be able to visualize which nerve fibers will carry the electrical stimulation therapy, e.g., which nerve fibers will be stimulated by the electric field.

To assist in visualizing the patient anatomy affected by the electrical stimulation therapy, the user may acquire an image of the patient using a modality different than the fluoroscopic imaging modality. For example, the user may acquire an image of the patient using a tensor imaging modality, which may display nerve fibers. In this example, the base image may be the fluoroscopic image, and the comparative image may be the tensor image. In this example, in addition to the base image and the comparative image being taken with different imaging modalities, the base image and the comparative image may be taken at a substantially similar time, e.g., during one patient visit, or at different times, e.g., during two different patient visits. Also, although this example describes the base image as being the fluoroscopic image, and the comparative image as being the tensor image, in an alternate example, the base image may be the tensor image and the comparative image may be the fluoroscopic image.

The user may compare the base image, e.g., the fluoroscopic image, with the comparative image, e.g., the tensor image, to determine the parameters of the electrical stimulation therapy. For instance, similar to the above examples, the user may move the visualizer along the base image, and the image processing device may reconstruct the segment encompassed with the visualizer with the corresponding segment in the comparative image. However, in this example, the reconstructed segment in the base image is reconstructed with a segment taken with a different imaging modality, e.g., the segment of a fluoroscopic image is reconstructed with a segment from a tensor image.

In this manner, the user may be able to identify locations of the leads or electrodes relative to patient tissue, e.g., nerve fibers. With such identification, the user may be able to estimate how the electrical stimulation therapy may stimulate the nerve fibers. For instance, in examples where the image processing device comprises a medical device programmer, the medical device programmer may store a model of how nerve fibers disseminate electrical stimulation from electrodes carried by one or more leads of an IMD. From the stored model and the nerve fibers encompassed by the reconstructed segment of the base image, the medical device programmer may provide an estimation of how the electrical stimulation may disseminate through the nerve fibers. For example, from the reconstructed segment, the medical device programmer may determine properties of the nerve fibers, such as nerve fiber size and neuronal properties. Based on the determined properties and the stored model, the medical device programmer may develop an algorithm that estimates the dissemination of electrical stimulation therapy for given electrical stimulation therapy parameters.

For example, as described above, the reconstructed segment may show a relationship between the one or more leads displayed in the base image and the comparative image. In this example, the comparative image may comprise an image of tissue of the patient, e.g., nerve fibers. The relationship shown by the reconstructed segment may comprise a relationship between a location of the leads displayed in the base image relative to the tissue of the patient displayed in the reconstructed segment, which may be from the comparative image.

FIG. 1 is a block diagram illustrating an imaging system 10. Imaging system 10 may include imaging source 12, programmer 14, image processing device 16, and network 18. In some examples, image processing device 16 may be formed as a part of programmer 14. Also, in some examples, image processing device 16 may be a part of imaging source 12. Furthermore, in some examples, imaging source 12, programmer 14, and image processing device 16 may be directly coupled to one another. In these examples, imaging system 10 may not include network 18.

Imaging source 12 may be configured to acquire images of a patient utilizing different selectable imaging modalities or a single imaging modality. For example, a user may configure imaging source 12 to acquire a fluoroscopic image of the patient, and may then configure imaging source 12 to acquire a tensor image of the patient. As an alternate example, imaging source 12 may be operable to take either fluoroscopic images or tensor images. In this alternate example, imaging system 10 may include more than one imaging source 12 in some, but not all, instances. For example, imaging system 10 may include a first imaging source to take fluoroscopic images, and a second imaging source to take tensor images. In this example, the first and second imaging sources may be individually coupled to network 18, or coupled directly to image processing device 16 and programmer 14 in examples where imaging system 10 does not include network 18.

Network 18 may be a wired or wireless network, or comprise a combination of wired and wireless networks. Network 18 may allow imaging source 12, programmer 14, and image processing device 16 to communicate with one another. For example, imaging source 12 may transmit images to image processing device 16 with network 18. In some cases, imaging source 12 may be located in a imaging department of a health care facility, and may transmit images to processing device 16 located in a different department of the health care facility via network communication through network 18, e.g., according to Digital Imaging and Communications in Medicine (DICOM) protocols for distributing and viewing medical images.

As alternatives, imaging source 12, programmer 14, and image processing device 16 may exchange information by other techniques, such as direct connect interfaces, wireless telemetry, exchange of data storage media such as memory cards or disks, or the like. In some examples, although not shown in FIG. 1, an image capture device such as a digital camera may also be connected to network 18 to provide an image displayed on a display of imaging source 12 to programmer 14 and/or image processing device 16. In some examples, programmer 14 or image processing device 16 may include the functionality of the image capture device.

Programmer 14 may be a programmer with which a user, such as a clinician, physician, or patient interacts with a medical device that provides therapy to the patient, e.g., electrical stimulation therapy. For example, the user may interact with a user interface of programmer 14 to program the medical device to provide specified therapy to the patient. For purposes of illustration, the examples described in this disclosure are described in the context of the therapy being electrical stimulation therapy. However, aspects of this disclosure should not be considered limited to electrical stimulation therapy and may be extended to other therapies such as a drug delivery therapy. In general, aspects of this disclosure may be extended to any therapy where it may be desirable to acquire images of the patient.

As one example, the user may select electrical stimulation therapy parameters such as a voltage or current amplitude, pulse width of the stimulation, and pulse rate of the stimulation, as well as electrode combinations and polarities. Programming of the medical device may refer generally to the generation and transfer of commands, programs, or other information to control the operation of stimulator of the medical device that outputs electrical stimulation therapy. For example, programmer 14 may transmit programs, parameter adjustments, program selections, group selections, or other information to control the electrical stimulation therapy outputted by the medical device, e.g., by wireless telemetry. Parameter adjustments may refer to initial parameter settings or adjustments to such settings. A program may specify a set of parameters that define stimulation. A group may specify a set of programs that define different types of stimulation, which may be delivered simultaneously using pulses with independent amplitudes or on a time-interleaved basis.

Image processing device 16 may be any type of device capable of processing images. For example, image processing device 16 may be a tablet computing device or a general purpose computer that includes suitable hardware and software for image analysis. As one example, image processing device 16 may be any suitable stand-alone computer. As another example, instead of a general purpose computer, image processing device 12 may be a dedicated computing device that is specifically configured for image processing. As yet another example, as described above, image processing device 16 may be a part of programmer 14. In other words, in this example, programmer 14 may be configured to perform the functions of image processing device 16 described in this disclosure.

A user may utilize image processing device 16 to select the parameters for the electrical stimulation therapy. For example, during implantation of one or more leads that output the electrical stimulation therapy and are coupled to the medical device, or shortly after implantation, the user may acquire an image that displays the location of the implanted leads within the patient with imaging source 12. In this example, this image may be referred to as a base image.

Imaging source 12 may transmit the base image to the image processing device 16. The user may view the base image on image processing device 16, and select electrical stimulation therapy parameters based on the locations of the leads. The user may then cause programmer 14 to program the medical device to provide electrical stimulation therapy in accordance with the selected parameters. In examples where programmer 14 performs the functions of image processing device 16, programmer 14 may analyze the base image to select electrical stimulation therapy parameters. The user may then choose to program the medical device with the programmer 14 selected electrical stimulation therapy parameters, or may override the programmer 14 selected electrical stimulation therapy parameters, and select one or more other electrical stimulation therapy parameters.

In this example, the electrical stimulation therapy parameters may be optimal to address patient condition when the implanted leads are in their implanted location. However, due to normal patient movement, the implanted leads may migrate from their implanted location. For example, movements such as sitting and standing, shifting from a prone to a supine position, running, and walking may cause the leads to migrate from their implanted location. The leads may migrate in any direction, e.g., upward, downward, rightward, leftward, forward, backward, or any combination thereof. Directional leads, such as a lead having a segmented electrode, may rotate. Such lead migration may possibly reduce the efficacy of the programmed electrical stimulation therapy. For example, if two leads move further apart, relative to one another, or relative to target tissue, the previously used amplitude of the electrical stimulation therapy may no longer be sufficient. Conversely, if the two leads move closer together, relative to one another, or relative to target tissue, the previously used amplitude of the electrical stimulation therapy may now be greater than desired.

In some examples, this disclosure describes example techniques to identify such lead migration. As described above, during implantation or shortly thereafter, the user may take a base image of the patient with imaging source 12, which may display the implanted leads. As one example, the base image may be a fluoroscopic image. In general, fluoroscopic imaging modalities may be well suited to clearly display implanted leads, although it may be possible to utilize other imaging modalities to display implanted leads.

When the patient arrives for a visit subsequent to the implantation visit, the user may acquire another image of the implanted leads. This another image may be referred to as a comparative image. In this example, the user may utilize the same imaging modality to acquire the comparative image that the user used to acquire the base image. For example, the base and comparative images may both be fluoroscopic images. Imaging source 12 may transmit the comparative image to image processing device 16.

Image processing device 16 may receive the base image from imaging source 12 and may store the base image. Then, after imaging source 12 acquires the comparative image, image processing device 16 may receive the comparative image. Image processing device 16 may then compare the base and comparative images to identify lead migration.

However, before comparing the base and comparative images, in some examples, image processing device 16 may normalize the coordinates of the base and comparative images. It may not be necessary to normalize the coordinates of the base and comparative images in every example. Normalizing the coordinates of the base and comparative images may account for positional differences between the base and comparative images.

For example, the patient's distance from imaging source 12 may be different when the user acquired the base image, as compared to when the user acquired the comparative image. As another example, the transverse, axial, or angular position of the patient may be different when the user acquired the base image, as compared to when the user acquired the comparative image. As one example, the patient may have been centered with imaging source 12 when the user acquired the base image. Then, when the user acquired the comparative image, the patient may have shifted from the center of imaging source 12, e.g., moved upward, downward, rightward, or leftward relative to the center of imaging source 12. As another example, the patient may have been flat relative to imaging source 12 when the user acquired the base image. Then, when the user acquired the comparative image, the patient may not have been flat relative to imaging source 12, e.g., may have been at a tilted angle relative to imaging source 12.

It should be understood that although the preceding examples described imaging source 12 being in the same position for the base and comparative images, and the patient being in different positions, aspects of this disclosure are not so limited. In alternate situations, the position of the patient may remain constant for the base and comparative images, and the position of imaging source 12 may be different. Accordingly, positional differences of imaging source 12 and the patient, between the base and comparative images, may be relative to one another.

Such positional differences of the patient or of imaging source 12 may potentially cause the user or image processing device 16 to incorrectly identify lead migration. For example, a lead may appear to have migrated; however, the appearance of lead migration may actually have been caused by positional differences of the patient and/or imaging source 12. It may be difficult for the user or image processing device 16 to differentiate between actual lead migration and perceived lead migration due to positional differences of the patient and/or imaging source 12. Normalizing the base and comparative images may make it easier for the user or image processing device 16 to identify actual lead migration, instead of perceived lead migration, by accounting for the positional differences between the patient and/or imaging source 12 in the base and comparative images.

There may be various known techniques, or techniques to be developed in the future, to normalize the base image and comparative image. Image processing device 16 may apply any of these techniques to normalize the base and comparative images. As one example, image processing device 16 may display both the base image and the comparative image. The user may select the same anatomical points in both the base and comparative image. For example, the user may select the same anatomical points via a user interface of image processing device 16. The user interface may be the touchscreen of image processing device 16 that is displaying the base and comparative images, or other user interfaces such as mouse, trackball, and keypad. Selection of the same anatomical points may be considered as selection of one or more pixels or coordinates in each of the base and comparative images that correspond to the same anatomical points.

For instance, the fluoroscopic image may display some anatomy of the patient, such as a vertebrae and the spinal column of the spine. In this example, the user may select the same vertebrae or spinal column points in both the base and comparative image. In some examples, the user may select at least three anatomical points that are the same in the both the base image and the comparative image.

It may be possible for the user to select non-anatomical points captured in the base and comparative images such an implanted medical device or the implanted leads. However, because such non-anatomical points may migrate, the user may find it more desirable to select anatomical points. In general, anatomical points may be less likely to migrate as compared to non-anatomical points. For instances, between patient visits, it may be far less likely that structures of the spinal cord shifted as compared to the implanted leads.

In this example, after the user selects at least three points that are the same in the base and comparative image, image processing device 16 may execute an optimization routine that creates a relationship between the coordinates of the base and comparative images. One example of the optimization routine may be the least-squares method, as described in greater detail below. The creation of the relationship between the coordinates of the base and comparative images may be considered as "registering" the base and comparative images. In other words, image processing device 16 may register the base and comparative images to each other by utilizing optimization routines.

For example, image processing device 16 may determine the coordinates of the selected anatomical points in both the base image and the comparative image. At this juncture, the coordinates of the anatomical points selected in the base image are going to be relative to the coordinate system of the base image, and the coordinates of the same anatomical points selected in the comparative image are going to be relative to the coordinate system of the comparative image. Accordingly, it may be possible that the same anatomical points in the base image and the comparative image comprise different coordinates in the base image as compared to the comparative image.

Image processing device 16 may then calculate a transform matrix. Calculation of the transform matrix may be considered as one example of the optimization routine. In some examples, image processing device 16 may need at least three points in the base image and three corresponding points in the comparative image, where each point is for the same anatomical point in the base and comparative image, to calculate the transform matrix. The transform matrix may define the relationship between the base image and the comparative image based on the relationship between these three points. In some examples, more than three points may be selected. The transform matrix may also be helpful in resolving the positional differences of the patient and/or imaging source 12 described above.

For example, if the coordinates of the T7 vertebrae in the base image were multiplied by the transform matrix, the resulting coordinates would be substantially the same as the coordinates for the T7 vertebrae in the comparative image. As described in more detail, as one example, image processing device 16 may multiply the coordinates of selected pixels in the base image with the transform matrix to normalize the coordinates of the base image with the coordinates of the comparative image. As one alternate example, image processing device 16 may multiply the coordinates of selected pixels in the comparative image with the inverse of the transform matrix to normalize the coordinates of the comparative image with the coordinates of the base image. In either example, after the multiplication, the coordinates of the selected pixels within the comparative image may be relative to the coordinate system of the base image, or vice-versa.

The preceding example for registering the base image to the comparative image, e.g., developing a relationship between the coordinates of the pixels in the base image and comparative image, is provided for illustration purposes. There may other techniques with which image processing device 16 develops a relationship between the base and comparative images. For instance, aspects of this disclosure should not be considered limited to the least-square method to generate a relationship between the coordinates of the base image and the coordinates of the comparative image. Aspects of this disclosure may be extended to other techniques that generate a relationship between the coordinates of the base image and the coordinates of the comparative image.

After applying the normalization techniques described above, or any other normalization techniques, any issues related to positional differences of imaging source 12 or the patient may now be resolved. In other words, differences in lead positions that are caused by positional differences of imaging source 12 or the patient in the base and comparative images may be factored out after image processing device 16 registers the base image to the comparative image, or vice-versa. By factoring out positional differences of imaging source 12 and/or the patient in the base and comparative images, image processing device 16 or the user may be better able to identify lead migration because any difference in the position of the leads in the base and comparative images may be due to lead migration and not positional differences of imaging source 12 and/or the patient between the base and comparative images.

Even after such normalization, it may be difficult for the user to visually identify lead migration. For example, the user may not be able to perceive slight lead migration due to the inherent low resolution of a fluoroscopic image. As another example, the user may believe that there is lead migration from visual inspection, when indeed there is no lead migration. In these examples, the user may not modify the parameters of the electrical stimulation therapy when desirable, or may modify, when not desirable, the parameters of the electrical stimulation therapy.

In some examples, to identify lead migration, image processing device 16 may reconstruct selected segments in the base image with corresponding segments in the comparative image. For example, the user may select two leads on the base image via the user interface of image processing device 16, and image processing device 16 may calculate the distance between the two leads. Then, the user may select a segment that includes one implanted lead in the base image, and reconstruct that segment with the corresponding segment in the comparative image. Image processing device 16 may then recalculate the distance between one lead that is displayed in the base image, and the lead displayed in the reconstructed segment. If the distances are different, image processing device 16 may determine that the leads migrated. If, however, the distances are the same, image processing device 16 may determine that the leads did not migrate.

As another example, the user may select one or more leads on the base image and target tissue on the base image via the user interface of image processing device 16. Then, the user may select a segment that includes one or more implanted leads in the base image, and reconstruct that segment with the corresponding segment in the comparative image. Image processing device 16 may then recalculate the distance between the one or more leads, displayed in the reconstructed segment, and the selected target tissue displayed in the base image. If the distances are different, image processing device 16 may determine that the leads migrated, and if the distances are the same, image processing device 16 may determine that the leads did not migrate.

With the reconstructed segment, the user or image processing device 16 may be able to discern a relationship between the location of the implanted leads as displayed in the base image, and the location of the implanted leads as displayed in the reconstructed segment. The relationship may be a relative relationship between the leads, or a relationship with the leads and patient tissue. Based on the relationship, the user or image processing device 16 may be able to identify lead migration. For instance, the relationship may show that one of leads displayed in the base image migrated relative to another lead displayed in the reconstructed segment, or relative to patient tissue. The relationship may also show that none of the leads displayed in the base image migrated relative any other lead displayed in the reconstructed segment, or the patient tissue.

The examples above describe techniques with which image processing device 16 may identify lead migration. However, aspects of this disclosure are not so limiting. In some examples, the techniques described in this disclosure may be applied to estimate dissemination of electrical stimulation therapy.

In general, after the leads deliver electrical stimulation therapy, the electrical pulses of the therapy disseminate along patient tissue such as nerve fibers, as one non-limiting examples. Fluoroscopic images may function well in displaying lead position, and some anatomy such as skeletal tissue, e.g., bones, spinal column, and vertebrae, but may not function well in displaying other anatomy that disseminates electrical therapy such as nerve fibers extending from the spinal column. The user may consider it desirable to visualize which nerve fibers will be stimulated and how these nerve fibers will disseminate the electrical pulses of the electrical stimulation therapy.

Similarly, tensor images may function well in displaying nerve fibers, but may not function well in displaying the implanted leads. Accordingly, if the user takes a tensor image of the patient, the user may not be able to visualize the locations of the implanted leads to determine if the nerve fibers would be stimulated by the electrical stimulation therapy, and if so, which nerve fibers would be stimulated. To assist in determining if the tissue of the patient will be stimulated, and which tissue, image processing device 16 may allow comparisons between two images taken with different imaging modalities.

For example, the user may take a first image of the patient with imaging source 12 with a first imaging modality. This first image may be the base image in this example. The user may then take a second image of the patient with imaging source 12 with a second imaging modality. This second image may be the comparative image in this example. For instance, the user may take a base image of the patient with the fluoroscopic imaging modality, and take a comparative image of the patient with the tensor imaging modality. In this example, similar to the lead migration example above, the user may take the base image and the comparative image during subsequent patient visits. Also, in an alternate example, different to the lead migration example above, the user may take the base image and the comparative image during the same patient visit. Moreover, although in this example, the fluoroscopic image is referred to as the base image and the tensor image is referred to as the comparative image, in alternate examples, the base image may be a tensor image and the comparative image may be a fluoroscopic image.

Similar to the lead migration example, image processing device 16 may receive the base and comparative images from imaging source 12. In this example, image processing device 16 may normalize coordinates within the base and comparative images as described above, e.g., utilizing the least-squares method, as one example. After normalization, the user may be able to reconstruct selected segments in the base image with corresponding segments in the comparative image. For example, with the user interface of image processing device 16, the user may select a segment in the base image which is proximate to where the implanted leads are displayed in the base image. Image processing device 16 may then reconstruct the selected segment of the base image with the corresponding segment of the comparative image. For example, in this case, image processing device 16 may reconstruct a segment of the fluoroscopic image with a corresponding segment of the tensor image. Image processing device 16 may estimate the manner in which the electrical stimulation therapy may disseminate based on the reconstructed segment in the base image. For example, image processing device 16 may be able to compare the position of the target tissue, e.g., the nerve fibers, with the implanted leads to estimate the manner in which the electrical stimulation therapy may disseminate. In this manner, the user may be better able to visualize which nerve fibers will be stimulated by the electrical pulses of the electrical stimulation therapy.

In some examples, the dissemination of electrical therapy may provide therapeutic relief to the patient. For example, when the patient is experiencing pain, electrical signals that indicate pain may travel through the nerve fibers to the patient's brain, which in turn causes the patient to perceive pain. In some of these examples, the dissemination of electrical therapy along the nerve fibers may block the electrical signals that indicate pain from reaching the patient's brain. In some alternate examples, the dissemination of electrical therapy along the nerve fibers may disrupt the electrical signals that indicate pain. For example, the disseminated electrical therapy may mix with the electrical signals that indicate pain. Because the electrical signals that indicate pain are mixed in with the disseminated electrical therapy, the patient's brain may not be able to detect the electrical signals that indicate pain. In this example, the disseminated electrical therapy may be considered as "drowning out" the electrical signals that indicate pain. There may be other reasons why the disseminated electrical therapy addresses the patient's condition, e.g., the perception of pain, and aspects of this disclosure should not be considered limited to the above examples.

With the reconstructed segment, the user or image processing device 16 may be able to discern a relationship between the location of the implanted leads as displayed in the base image relative to location of tissue in the patient. For instance, the relationship may show where the nerve fibers are relative to the location of the implanted leads. Based on the relationship, the user or image processing device 16 may be able to estimate dissemination of electrical stimulation therapy through the tissue of the patient.

In the above examples, it should be understood that what is considered to be the base image and comparative image may change for subsequent patient visits. For example, to identify lead migration, the user may take a base image of the patient during a first visit, and then take a comparative image of the patient during a second, subsequent visit. The user may then consider it desirable to identify lead migration that may have occurred between the second visit, and a third, subsequent visit. In this situation, the comparative image taken during the second visit may function as the base image, and the user may take a comparative image during the third visit to identify possible lead migration that may have occurred between the second and third visits.

Figure 2:
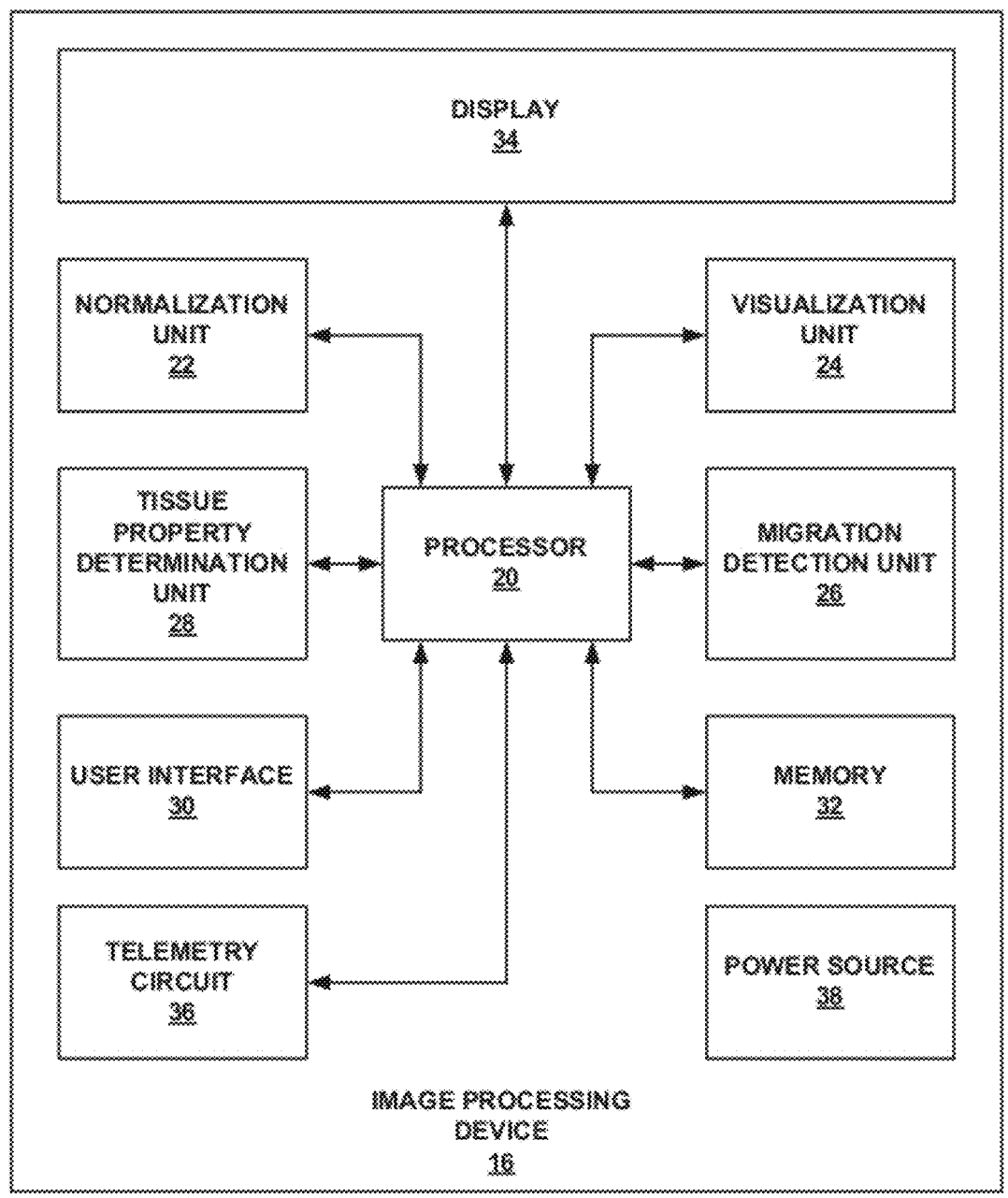
FIG. 2 is a block diagram illustrating an example of an image processing device of FIG. 1 in greater detail.

FIG. 2 is a block diagram illustrating an example of image processing device 16 in greater detail. Image processing device 16 may include processor 20, normalization unit 22, visualization unit 24, migration detection unit 26, tissue property determination unit 28, user interface 30, memory 32, display 34, telemetry circuit 36, and power source 38. Normalization unit 22, visualization unit 24, migration detection unit 26, and tissue property determination unit 28 may be implemented as individual or combinational software units executing on processor 20, as individual hardware units, a combination of software and hardware units, or may be formed as a part of processor 20. In some instances, in the examples described below that describe functionality of normalization unit 22, visualization unit 24, migration detection unit 26, and tissue property determination unit 28, such functionality may be considered as being performed by processing circuitry. Processor 20 may be one example of processing circuitry.

Moreover, although normalization unit 22, visualization unit 24, migration detection unit 26, and tissue property determination unit 28 are illustrated as separate units, aspects of this disclosure are not so limited. It should be understood that the various units, such as normalization unit 22, visualization unit 24, migration detection unit 26, and tissue property determination unit 28, described in this disclosure generally may take the form of functional units which may be referred together as processing circuitry. Such units are described separately to highlight particular functional aspects of image processing device 16, and do not necessarily imply that such aspects must be structured, arranged or coded separately. Accordingly, such functional aspects may be formed integrally or separately and commonly referred to as processing circuitry, executed on one processor 20 or multiple processors, or multiple processor cores, and the description should not be considered limiting as to the implementation of such functional aspects.

In some examples, image processing device 16 may be formed as part of programmer 14. In these examples, programmer 14 may include one or more of the components of image processing device 16 illustrated in FIG. 2, as well as other components for programming a medical device, as described in more detail below. In alternate examples where image processing device 16 and programmer 14 are separate devices, image processing device 16 may perform the functions as described, and transmit results to programmer 14 for programming of an implantable stimulator coupled to one or more implanted leads. The implantable stimulator and the one or more implanted leads may be a part of an implantable medical device.

Examples of processor 20 include, but are not limited to, one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Image processing device 16 may not include all of the units shown in FIG. 2 in every example. For example, if image processing device 16 is configured to identify lead migration, but is not configured to estimate dissemination of electrical therapy, then, in this example, image processing device 16 may not include tissue property determination unit 28. As another example, if image processing device 16 is configured to estimate dissemination of electrical therapy, but is not configured to identify lead migration, then, in this example, image processing device 16 may not include migration detection unit 26. As yet another example, aspects of this disclosure may assist the user in visually identifying lead migration, or estimating dissemination of electrical therapy. If user identification of lead migration or user estimation of dissemination of electrical therapy is sufficient, image processing device 16 may not include migration detection unit 26 and tissue property determination unit 28. Accordingly, FIG. 2 illustrates one example of image processing device 16 which can be configured to identify lead migration and estimate dissemination of electrical therapy, as well as assist the user in visually identifying lead migration and estimating dissemination of electrical therapy.

Image processing device 16 may receive the base image and comparative image from imaging source 12 via telemetry circuit 36. Telemetry circuit 36 may support wireless telemetry with imaging source 12, programmer 14, network 18 or another device by radio frequency (RF) communication, or other techniques. Telemetry circuit 36 may send information to and receive information from programmer 14 and imaging source 12 on a continuous basis, at periodic intervals, or upon request from imaging source 12 or programmer 14. To support RF communication, telemetry circuit 36 may include appropriate electronic components, such as amplifiers, filters, mixers, encoders, decoders, modulators, demodulators and the like.

Display 34 may be configured to display the received base image and comparative image. For example, to identify lead migration, imaging source 12 may have transmitted the base image, e.g., the fluoroscopic image taken during or shortly after implantation of the leads, to image processing device 16. Image processing device 16 may then have saved the base image in memory 32. Then, during a subsequent patient visit, imaging source 12 may transmit the comparative image, e.g., another fluoroscopic image, to image processing device 16. Display 34 may then display the base image stored in memory 32, and the comparative image received from imaging source 12. In an alternate example, instead of or in addition to memory 32 storing the base image, imaging source 12 may store the base image, and transmit both the base image and the comparative image to image processing device 16.

Display 34 may be liquid crystal display (LCD) or other display. In some examples, display 34 may be touch-screen. In these examples, display 34 may perform some or all of the functions of user interface 30. In examples where display 34 performs all of the functions of user interface 30, user interface 30 may not be necessary.

The user may interact with image processing device 16 with user interface 30. For example, with user interface 30, the user may select the three anatomical points needed to normalize the base image and the comparative image. As another example, with user interface 30, the user may be able to select segments of the base image to be reconstructed by the comparative image or vice-versa. Examples of user interface 30 include, but are not limited to, a mouse, trackball, directional keys, a stylus, soft keys, hard keys, a touch pad, and any of a variety of other input media.

Examples of memory 32 include, but are not limited to, random access memory (RAM), read-only memory (ROM), non-volatile random access memory (NVRAM), electrically erasable programmable read-only memory (EEPROM), FLASH memory, magnetic data storage media, optical data storage media, or the like. In some examples, memory 32 may be a computer-readable storage medium comprising instructions that cause the various units of image processing device 16 to perform their respective functions.

Memory 32 may, in some examples, be considered as a non-transitory storage medium. The term "non-transitory" may indicate that the storage medium is not embodied in a carrier wave or a propagated signal. However, the term "non-transitory" should not be interpreted to mean that memory 32 is non-movable. As one example, memory 32 may be removed from image processing device 16, and moved to another device. As another example, a storage device, substantially similar to memory 32, may be inserted into image processing device 16. In certain examples, a non-transitory storage medium may store data that can, over time, change (e.g., in RAM).

Power source 38 may supply operating power to the various units of image processing device 16. Power source 38 may include a rechargeable or non-rechargeable battery and a power generation circuit to produce the operating power. In examples where image processing device 16 includes a tablet computing device, a desktop computer, or a laptop computer, power source 38 may be connected to an alternating current (AC) outlet, i.e., AC line power, either directly or via an AC/DC adapter, and may supply operating power to the various units of image processing device 16 through the AC outlet.

Figure 7:
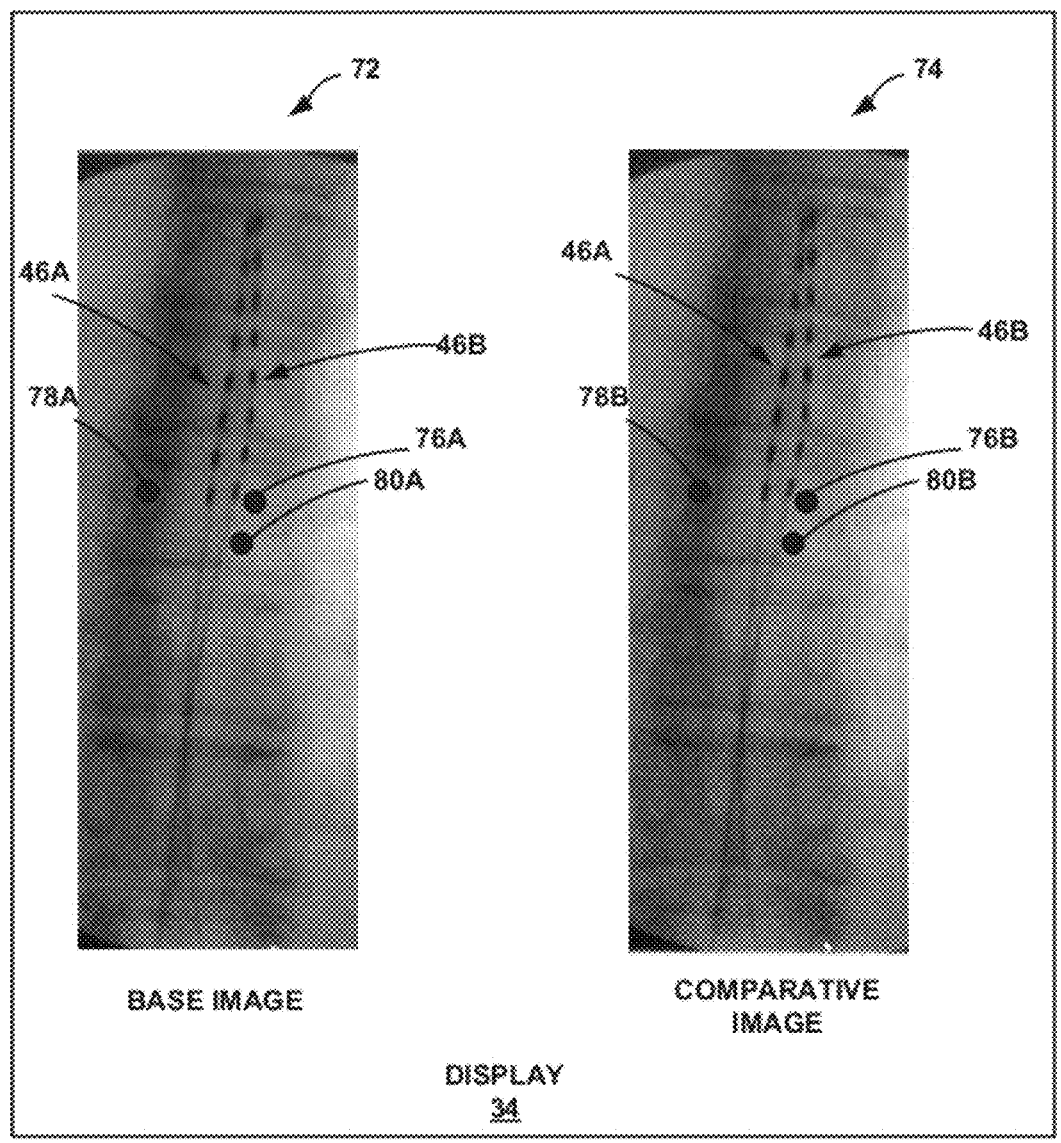
FIG. 7 is an example of a base image and a comparative image with which a user selects same anatomical points.
Figure 8:
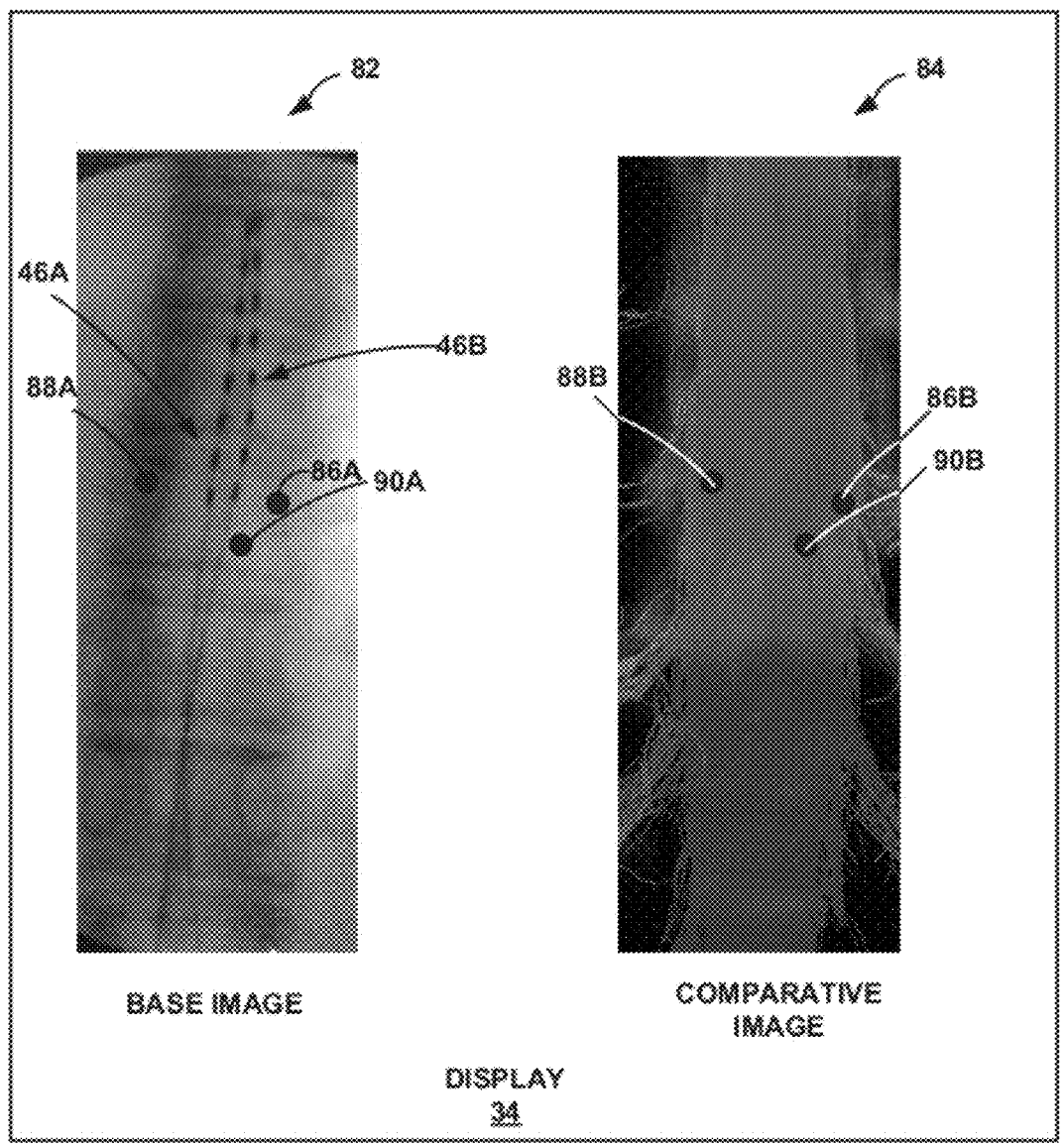
FIG. 8 is another example of a base image and a comparative image with which a user selects same anatomical points.

As described above, in some examples, after display 34 displays the base and comparative images, the user may want to normalize coordinates of base and comparative images to account for positional differences of imaging source 12 or the patient between the base and comparative image. The user, via display 34 or user interface 30, may select at least three anatomical points on the base image, and the same anatomical points in the comparative image. Examples of the user selection of three same anatomical points in the base and comparative images are illustrated in FIGS. 7 and 8.

Normalization unit 22 may then execute an optimization routine, such as the least-squares method, to create a relationship between the base and comparative images. For example, normalization unit 22 may determine the coordinates of each of the selected anatomical points in the base and comparative images. For example, the origins of the coordinates for both the base and comparative images may be the top-left corner of the images. Normalization unit 22 may then calculate the 2-dimensional (2D) coordinates for each of the selected anatomical points relative to their respective coordinate origins, e.g., the (x, y) coordinates for each anatomical point selected in the base image, and for each anatomical point selected in the comparative image.

In one example, normalization unit 22 may utilize the 2D coordinates for the three selected anatomical points in the base image and the same anatomical points selected in the comparative image to calculate a transform matrix. By normalizing the coordinates of the base and comparative images, normalization unit 22 may factor out the differences between the base and comparative images caused by positional differences of imaging source 12 and the patient between the base and comparative images. Accordingly, when image processing device 16 identifies lead migration or estimates dissemination of electrical therapy, such identification of lead migration or estimation of dissemination may truly be based on actual lead and tissue position, and not due to positional differences of imaging source 12 and the patient in the base and comparative images.

As described above, normalization unit 22 may utilize the least-squares method to generate a transform matrix that indicates a relationship between the coordinates of the base image and the coordinates of the comparative image. In some examples, the least-squares method may be an iterative method that calculates residual errors between actual coordinates and calculated coordinates that are calculated with the transform matrix with different variables. The transform matrix that generates the lowest residual errors may be the transform matrix that generates the relationship between the base image and the comparative image. Normalization unit 22 may calculate the residual errors utilizing a root-mean-square (RMS) technique.

Normalization unit 22 may resolve any potential difference in the zoom level between the base and comparative images, and may then resolve any transverse, axial, or rotational, e.g., tilt, differences between the base and comparative image. To illustrate the manner in which normalization unit 22 may utilize the coordinates of the selected anatomical points on the base and comparative images, assume that the three selected anatomical points on the base image include three dimensional (3-D) coordinates: $(xB1, yB1, zB1)$ for the first point in the base image, $(xB2, yB2, zB2)$ for the second point in the base image, and $(xB3, yB3, zB3)$ for the third point in the base image. Similarly, assume that the three selected anatomical points on the comparative include 3-D coordinates: $(xC1, yC1, zC1)$ for the first point in the comparative image, $(xC2, yC2, zC2)$ for the second point in the comparative image, and $(xC3, yC3, zC3)$ for the third point in the comparative image.

The zoom level may be the distance between the patient and imaging source 12, e.g., the z-coordinate in the example 3-D coordinates above. For example, to acquire the base image, the patient may be lying down at a first distance from imaging source 12, then to acquire the comparative image, the patient may be lying down at a second distance from imaging source 12. In some instances, it may be possible for the first and second distances to be different, which may cause the base and comparative images to appear as if they are zoomed in at different zoom levels. For instance, if the patient was closer to imaging source 12 when the user acquired the base image, as compared to when the user acquired the comparative image, the implanted leads in the base image may appear larger than the implanted leads in the comparative image. In other words, in this example, the base image may appear to be zoomed in more than the comparative image.

Normalization unit 22 may convert the coordinates of the three anatomical points of either the base image or the comparative image based on a focal length. For purposes of illustration, the example described below is described in the context of converting the three anatomical points of the comparative image. The focal length, referred to as "f," may be a distance from imaging source 12 where there is no zoom, and may be assigned a value such as 1000 centimeter (cm). The focal length may be assigned a value of 1000 cm because the focal length in some common imaging sources, such as imaging source 12 is approximate 1000 cm. However, the focal length of 1000 cm should not be considered limiting, and can be set to the focal length of the particular type of imaging source. In some alternate examples, it may be possible to set the focal length to a length other than the actual focal length of imaging source 12.

In some of the example implementations, the actual distances between the patient and imaging source 12 in the base and comparative image may not be as relevant as the relative distances between the patient and imaging source 12 in the base and comparative image. Normalization unit 22 may assign the $zC1$, $zC2$, and $zC3$ coordinates an arbitrary value, such as 500 cm, and assign the $zB1$, $zB2$, and $zB3$ coordinates an arbitrary value, such as 100 cm, that is different than the values for $zC1$, $zC2$, and $zC3$. Again, because the actual distances, e.g., the values of the z-coordinates, to imaging source 12 is not as relevant as the relative distances in the base and comparative images, it may be sufficient for normalization unit 12 to assign the $zC1$, $zC2$, and $zC3$ coordinates and the $zB1$, $zB2$, and $zB3$ coordinates different, arbitrary values.

The equation to convert coordinates of the three anatomical points of the comparative image, in this example, based on the focal length (f) may be: $uC1=(xC1/zC1)*f$, and $wC1=(yC1/zC1)*f$. With this equation, normalization unit 22 may calculate values for $uC1$ and $wC1$, and similarly calculate values $uC2$, $wC2$, and $uC3$, and $wC3$. Normalization unit 22 may then perform the following matrix calculation to generate normalized coordinates for the (uC1, wC1, zC1). The normalized coordinates for (uC1, wC1, zC1) are (uC1', wC1', zC1'). Normalization unit 22 may perform similar calculations to determine the normalized coordinates for (uC2, wC2, zC2) and (uC3, wC3, zC3).

$$\begin{bmatrix} uC1 \\ wC1 \\ zC1 \\ 1 \end{bmatrix} * \begin{bmatrix} 1 & 0 & 0 & 0 \\ 0 & 1 & 0 & 0 \\ 0 & 0 & 1 & 0 \\ 0 & 0 & 0 & 1 \end{bmatrix} = \begin{bmatrix} uC1' \\ wC1' \\ zC1' \\ 1 \end{bmatrix}$$

After calculating the projected coordinates (uC1', wC1', zC1'), (uC2', wC2', zC2'), and (uC3', wC3', zC3'), normalization unit 22 may calculate the residual error between the normalized coordinates of the comparative image and the actual coordinates of the base image. The residual error may be calculated with the RMS technique. In the RIMS technique, normalization unit 22 may calculate the square of the difference between actual coordinates and the normalized coordinates. For example, normalization unit 22 may perform the following calculation:

$r1 = (xB1-uC1')^2 + (yB1-wC1')^2$ $r2 = (xB2-uC2')^2 + (yB2-wC2')^2$ $r3 = (xB3-uC3')^2 + (yB3-wC3')^2$

Normalization unit 22 may then square the resulting values, sum the squared values, and divide the result with the number of selected anatomical points. The resulting value may be the residual error. For example, normalization unit 22 may perform the following calculation:

$$\text{Residual error} = \sqrt{\frac{r1^2 + r2^2 + r3^2}{3}}$$

Normalization unit 22 may store the residual error in memory 32. Next, normalization unit 22 may increment the values of z-coordinates for the comparative image, e.g., increment the values for zC1, zC2, and zC3. Normalization unit 22 may then repeat the above steps, with the new z-coordinate values for the comparative image, and calculate a new residual error value for the new z-coordinate. Normalization unit 22 may keep repeating the above steps, e.g., keep incrementing the z-coordinate values for the comparative image and calculating the residual error, until the z-coordinate values for the comparative image equal to the focal length. Normalization unit 22 may then determine which z-coordinate values resulted in the smallest residual error, and select the uC1, wC1, uC2, wC2, and uC3, wC3 values that correspond to the zC1, zC2, and zC3 values that resulted in the lowest residual error. For purposes of illustration, the coordinates that resulted in the lowest residual error are designated as: (uC1", wC1", zC1"), (uC2", wC2", zC2"), and (uC3", wC3", zC3").

At this juncture, normalization unit 22 may have resolved differences between the zoom of the base and comparative images, e.g., differences between the distance of the patient from imaging source 12 in the base and comparative images. In some examples, it may be possible that the patient was not aligned the same when the user acquired the base and comparative images. For example, the patient may have been centered, relative to imaging source 12, when the user acquired the base image. However, when the user acquired the comparative image, the patient may not have been centered, e.g., may have moved transversally or axially. Also, the patient may have been at different tilts, e.g., angular positions, relative to imaging source 12, when the user acquired the base and comparative images.

Normalization unit 22 may resolve any differences in the transverse or axial position of the patient, as well as any differences in the angular positions. To resolve such differences, normalization unit 22 may normalize the selected base coordinates using a transform matrix. For example, normalization unit 22 may perform the following equations for each of the selected anatomical points on the base image. For purposes of illustration, only the normalized coordinates for the first anatomical point in the base image is illustrated. Normalization unit 22 may perform similar calculations for the other anatomical points in the base image. As described above, the coordinates for the selected anatomical points on the base image are: (xB1, yB1, zB1) for the first point in the base image, (xB2, yB2, zB2) for the second point in the base image, and (xB3, yB3, zB3) for the third point in the base image. For example, normalization unit 22 may perform the following calculations.

$$\begin{bmatrix} xCB1 \\ yCB1 \\ zCB1 \\ 1 \end{bmatrix} = T^{-1} * \begin{bmatrix} uC1'' \\ wC1'' \\ zC1'' \\ 1 \end{bmatrix}$$

where transform matrix T is:

$$T = \begin{bmatrix} R11 & R12 & R13 & Tx \\ R21 & R22 & R23 & Ty \\ R31 & R32 & R33 & Tz \\ 0 & 0 & 0 & 1 \end{bmatrix}$$

where R11 to R33 are defined in the 3 by 3 matrix as below:

$$\begin{pmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{pmatrix}$$

In particular, as indicated above, R11 equals $\cos\alpha*\cos\beta$, R12 equals $\cos\alpha*\sin\beta*\sin\gamma - \sin\alpha*\cos\gamma$, R13 equals $\cos\alpha*\sin\beta*\cos\gamma + \sin\alpha*\sin\gamma$, R21 equals $\sin\alpha*\cos\beta$, R22 equals $\sin\alpha*\sin\beta*\sin\gamma + \cos\alpha*\cos\gamma$, R23 equals $\sin\alpha*\sin\beta*\cos\gamma - \cos\alpha*\sin\gamma$, R31 equals $-\sin\beta$, R32 equals $\cos\beta*\sin\gamma$, and R33 equals $\cos\beta*\cos\gamma$, where $\alpha$ is an angle relative to the x-axis, indicating rotation around the x-axis, also referred to as the roll, $\beta$ is an angle relative to the y-axis, indicating rotation around the y-axis, also referred to as the pitch, $\gamma$ is an angle relative to the z-axis, indicating rotation around the z-axis, also known as the yaw, and * is the multiplication operator.

$T_x$ is the transverse position, i.e., the distance the selected point is from the origin along the x-axis. $T_y$ is the axial position, i.e., the distance the selected is from the origin along the y-axis. $T_z$ is the depth, i.e., the distance the selected point is from the origin along the z-axis. In this example, origin may be considered as the location where a vertical line that extends from imaging source 12 intersects a plane where the patient rests when the user is acquiring the base and comparative images.

In this example, normalization unit 22 may initially select a value for each of the variables for the above matrices. For example, normalization unit 22 may select a value for $\alpha$, $\beta$, $\gamma$, $T_x$, $T_y$, and $T_z$. Normalization unit 22 may then calculate the normalized coordinates (xCB1, yCB1, zCB1), (xCB2, yCB2, zCB2), and (xCB3, yCB3, zCB3) with the selected values utilizing the above matrix calculations. Normalization unit 22 may then calculate the residual error between the normalized coordinates and the (xB1, yB1, zB1), (xB2, yB2, zB2), and (xB3, yB3, zB3) coordinates. For example, normalization unit 22 may perform the following calculations.

$$r4 = (xB1-xCB1)^2 + (yB1-yCB1)^2 - (zB1-zCB1)^2$$

$$r5 = (xB2-xCB2)^2 + (yB2-yCB2)^2 + (zB2-zCB2)^2$$

$$r6 = (xB3-xCB3)^2 + (yB3-yCB3)^2 + (zB3-zCB3)^2$$

Normalization unit 22 may then square the resulting values, e.g., r4, r5, and r6, sum the squared values, and divide the result with the number of selected anatomical points. The resulting value may be the residual error. For example, normalization unit 22 may perform the following calculation:

$$\text{Residual error} = \sqrt{\frac{r4^2 + r5^2 + r6^2}{3}}$$

Normalization unit 22 may store the residual error in memory 32. Next, normalization unit 22 may increment the values of at least one of $\alpha$, $\beta$, $\gamma$, $T_x$, $T_y$, and $T_z$ while keeping the other variables the same. For example, normalization unit 22 may keep the variables $\alpha$, $\beta$, $\gamma$, $T_x$, and $T_y$ the same, and increment the value for the $T_z$ variable. Normalization unit 22 may then recalculate the residual error, and repeat the above steps for all values of $T_z$. Then normalization unit 22 may perform the above steps again. However, in this instance, normalization unit 22 may keep the variables $\alpha$, $\beta$, $\gamma$, $T_x$, and $T_z$ the same, and increment the value for $T_y$. Normalization unit 22 may repeat these steps for each of the variables, and store the resulting residual error in memory 32.

After all of the residual errors are stored in memory 32, normalization unit 22 may determine which values of $\alpha$, $\beta$, $\gamma$, $T_x$, $T_y$, and $T_z$ resulted in the lowest residual error. Normalization unit 22 may then calculate transform matrix T, as described above, based on the determined values of $\alpha$, $\beta$, $\gamma$, $T_x$, $T_y$, and $T_z$ that resulted in the lowest residual error. This calculated transform matrix T may be the transform matrix that defines the relationship between the base image and the comparative image. For example, if the coordinates (xB1, yB1, zB1) were multiplied by the calculated transform matrix, the resulting coordinates would be (xBC1, yBC1, and zBC1). In other words, the calculated transform matrix defines the relationship between the coordinates for an anatomical point in the base image and the coordinates for the same anatomical point in the comparative image.

It should be understood that the above example is provided for illustration purposes only, and should not be considered as limiting. For example, normalization unit 22 may apply any technique other than the above described technique to define the relationship between the coordinates of the base image and the comparative image. Moreover, if the user takes care to ensure that the positioning of the patient is consistently the same in the both base and comparative images, the functionality of normalization unit 22 may not be necessary. Also, in some examples, the user may manually rotate and zoom the base image or comparative image via user interface 30 on image processing device 16 to resolve any positional differences of the patient between when imaging source 12 acquired the base and comparative images.

In some non-limiting examples, image processing device 12 may identify lead migration or estimate electrical therapy dissemination after normalization unit determines the values of the transform matrix T. To identify lead migration or to estimate electrical therapy dissemination, the user may select a segment in the base image, and reconstruct the selected segment with a corresponding segment in the comparative image. For example, by selecting a segment that includes a lead in the base image, and reconstructing that segment with the corresponding segment in the comparative image, the user or image processing device 16 may be able to identify if that lead migrated. As another example, by selecting a segment near a lead in the base image, which may be fluoroscopic image, and reconstructing that segment with the corresponding segment in the comparative image, which may be a tensor image, the user or image processing device 16 may be able to estimate how the electrical stimulation will disseminate through the nerve fibers. The selected segment may be two-dimensional area or region in the base image. The shape of the selected segment may be based on a size and shape of a visualizer, as described below.

In alternate examples, either for identifying lead migration or estimating dissemination of electrical stimulation, rather than selecting a segment in the base image, the user may select a segment in the comparative image. In these alternate examples, image processing device 16 may reconstruct the segment in the comparative image with the corresponding segment in the base image. For purposes of illustration, aspects of this disclosure are described in the context where the user selects segments in the base image that are reconstructed with corresponding segments in the comparative image, with the understanding that the opposite is also possible.

Visualization unit 24 may allow the user to select a segment in the base image, and reconstruct the selected segment with corresponding segment in the comparative image. To select a segment in the base image, visualization unit 24 may display a visualizer on display 34. Visualization unit 24 may allow the user to select the size and shape of the visualizer based on the size and shape of the segment the user desires to select.

Figure 11A:
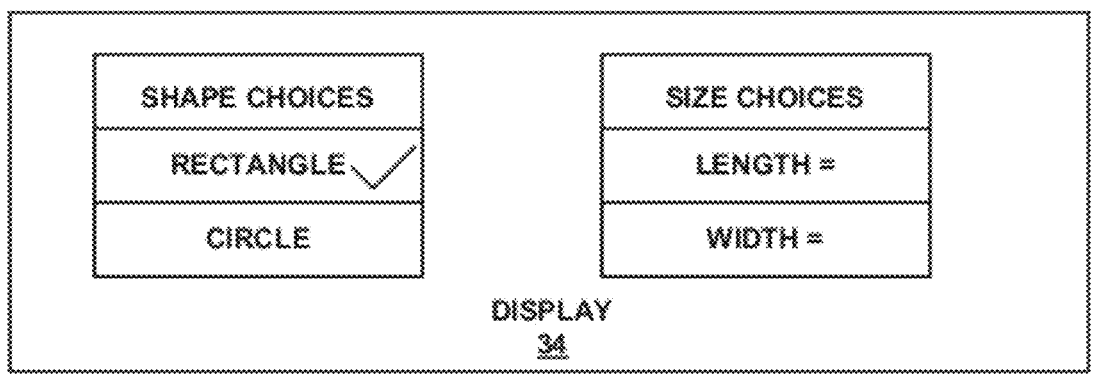
FIGS. 11A and 11B are conceptual diagrams illustrating a process by which a user selects the size and shape of the visualizer generated by a visualization unit.
Figure 11B:
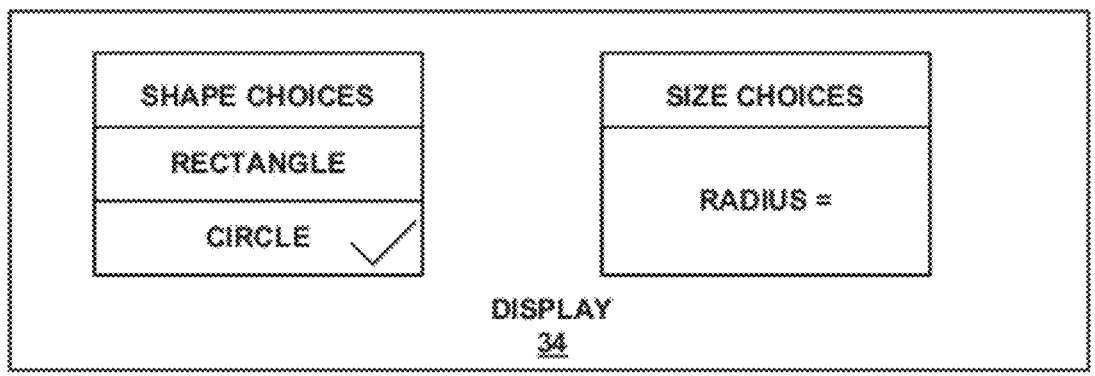

For example, visualization unit 24 may present a menu option of the shape of the visualizer. The menu options may include standard geometries such as triangles, ovals, and rectangles. The menu options may also include complicated geometries such as a checkered pattern, or allow the user to define his or her visualizer geometry. Visualization unit 24 may also allow the user to define the size of the selected shape. For example, if the user selects a rectangle for the visualizer, the user may define the length and width of the rectangle with the menu options presented by visualization unit 24. As another example, if the user selects a circle for the visualizer, the user may define the radius of the circle with the menu options presented by visualization unit 24. Examples of the menu options provided by visualization unit 24 are illustrated in FIGS. 11A and 11B. In an alternate example, visualization unit 24 may predefine the size and shape of the visualizer, and the user may not be able to modify the predefined size and shape of the visualizer.

With user interface 30, the user may move the visualizer, generated by visualization unit 24, along the base image displayed by display 34. The size and shape of the visualizer, generated by visualization unit 24, may define the size and shape of the segment that the user selects. For example, the user may move the visualizer to a desired area on the base image. The user may then select the area encompassed by the visualizer, with user interface 30. In this example, the area encompassed by the visualizer may be the selected segment in the base image.

After the user selects the segment in the base image, visualization unit 24 may determine the coordinates of the visualizer on the base image. For example, the visualizer may be a rectangle. In this example, after the user selects the segment in the base image, visualization unit 24 may determine the coordinates of the vertices of the rectangular visualizer.

Visualization unit 24 may then determine the coordinates of the corresponding segment in the comparative image. The corresponding segment in the comparative image may be a segment for the same anatomical area in the comparative image that is encompassed by the visualizer in the base image. To determine the coordinates of the corresponding segment in the comparative image, visualization unit 24 may multiply the coordinates of the visualizer in the base image with the transform matrix calculated by normalization unit 22, e.g., transform matrix T whose values normalization unit 22 may calculate.

With the coordinates of the corresponding segment in the comparative image, visualization unit 24 may reconstruct the selected segment in the base image. Reconstructing the selected segment may refer to incorporating the corresponding segment in the comparative image to generate a relationship between the base and comparative images. There may be at least two techniques with which visualization unit 24 may reconstruct the selected segment in the base image with the corresponding segment in the comparative image. As one example technique, visualization unit 24 may clear the area of the base image encompassed by the visualizer. Visualization unit 24 may then fill in the clear area of the base image that is encompassed by the visualizer with the corresponding segment in the comparative image. In other words, visualization unit 24 may replace the area of the base image encompassed by the visualizer with the corresponding segment of the comparative image.

As another example, rather than clearing the area of the base image encompassed by the visualizer, visualization unit 24 may overlay the corresponding segment in the comparative image on top of the area of the base image encompassed by the visualizer. In some examples, visualization unit 24 may increase the transparency of the corresponding segment of the comparative image, or the color of the corresponding segment of the comparative image such that the user can view both the selected segment in the base image, and the corresponding segment in the comparative image in the base image. In some alternate examples, visualization unit 24 may overlay the corresponding segment in the comparative image on top of the area of the base image encompassed by the visualizer such that the corresponding segment in the comparative image fully occludes the area of the base image encompassed by the visualizer.

In some examples, rather than waiting for the user to move the visualizer to the desired segment in the base image, and then reconstructing the segment in the base image with the corresponding segment in the comparative image, visualization unit 24 may continuously reconstruct the area encompassed by the visualizer. For example, visualization unit 24 may repeatedly reconstruct the area encompassed by the visualizer with the corresponding segment in the comparative image as the user moves the visualizer along the base image. In this manner, the user may not need to repeatedly select a segment for reconstruction; rather, visualization unit 24 may automatically reconstruct the area encompassed by the visualizer as the user moves the visualizer along the base image.

Figure 9:
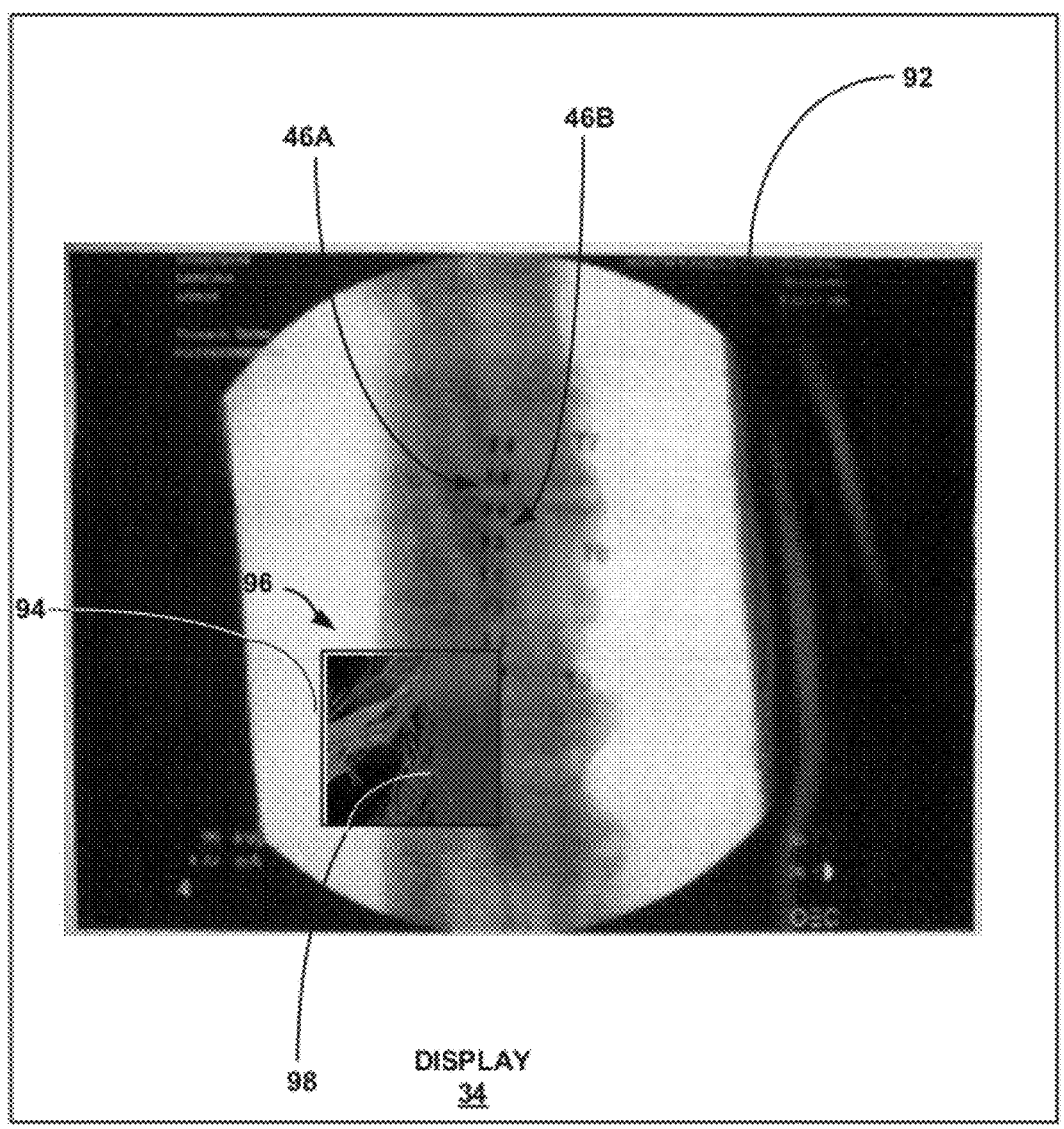
FIG. 9 is an example of a reconstructed segment in a base image.
Figure 10:
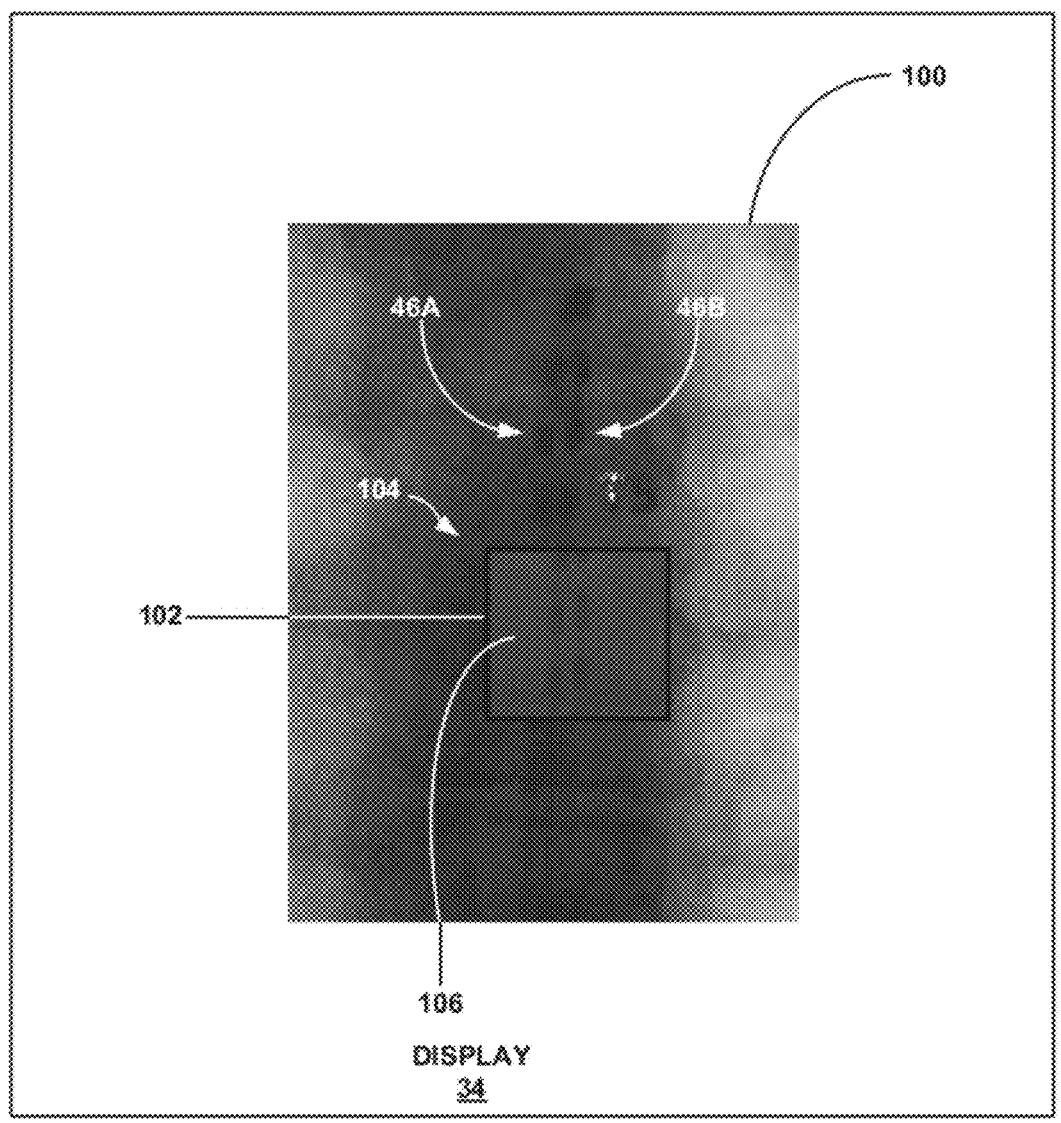
FIG. 10 is another example of a reconstructed segment in a base image.

The reconstruction of the selected segment in the base image with the corresponding segment in the comparative image may assist the user in identifying lead migration and/or estimating dissemination of electrical stimulation in the tissue. Examples of the reconstruction of the selected segment in the base image with the corresponding segment in the comparative image are illustrated in FIGS. 9 and 10. As one example, to identify lead migration, the user may move the visualizer generated by visualization unit 24 along a lead displayed in the base image. After visualization unit 24 reconstructs the segment of the base image, encompassed by the visualizer, with corresponding segment in the comparative image, the lead within the visualizer may appear disjointed if there was lead migration, or appear continuous if there was no lead migration. In this manner, the user may be able to identify even slight lead migration that the user may not have been able to identify with a side-by-side comparison of the base and comparative images.

As another example, to estimate dissemination of the electrical stimulation, the user may move the visualizer generated by visualization unit 24 near a lead displayed in the base image. After visualization unit 24 reconstructs the segment of the base image, encompassed by the visualizer, the corresponding segment in the comparative image, the area encompassed by the visualizer may be replaced or overlaid with the nerve fibers that belong in that area of the patient. In this manner, the user may be able to better understand which nerve fibers may be stimulated, e.g., estimate dissemination of the electrical stimulation. For example, the user may be able to visualize the position of the implanted leads relative to the target tissue, e.g., nerve fibers in this example, to estimate dissemination of the electrical stimulation.

As one example, processor 20 may be programmed to display the contours of an electric field generated by electrical pulses of the electrical stimulation therapy. For example, for given parameters of the electrical stimulation therapy, processor 20 may be configured to estimate how the electric fields will emanate from the leads from the current position of the leads in the patient. Processor 20 may display the electric fields on the base image via display 34. By seeing the electric fields on the base image as they might emanate from the leads at their current position, and the nerve fibers via the reconstruction by visualization unit 24, the user may be able to visually estimate which nerve fibers will be stimulated and by how much, e.g., which nerve fibers will disseminate the electrical stimulation.

In some examples, rather than relying on the user to identify lead migration or estimate dissemination of electrical stimulation, image processing device 16 may identify lead migration or estimate dissemination of electrical stimulation. For example, to identify lead migration, image processing device 16 may include migration detection unit 26 which may be a stand-alone hardware unit, a software unit executing on processor 20, processing circuitry combined with one or more other units of image processing device 16, or a combination thereof.

Migration detection unit 26 may determine the distances between the electrodes on each of the two leads displayed in the base image. There may be multiple techniques with which migration detection unit 26 may determine the distances between the electrodes on each of the two leads displayed in the base image. Examples of such techniques are described in U.S. Patent Publication 2010/0135553, entitled "IMAGE-BASED CHARACTERIZATION OF IMPLANTED MEDI- CAL LEADS," and in U.S. Patent Publication 2009/0196471, entitled "CHARACTERIZATION OF ELECTRICAL STIMULATION ELECTRODES USING POST-IMPLANT IMAGING," the contents of each of which are incorporated by reference in their entirety.

As one example, migration detection unit 26 may identify the electrodes on each of the leads by comparing the color values of each of the pixels in the base image to a threshold color value. In general, electrodes of a lead in a fluoroscopic image appear darker than other structures. Therefore, if the color value of a pixel in the base image is greater than the threshold color value, that pixel in the base image may be for an electrode, and if the color value of a pixel in the base image is less than the threshold color value, that pixel in the base image may not be for an electrode.

Migration detection unit 26 may repeat the above steps for each pixel in the base image. At the conclusion, migration detection unit 26 may identify groups of dark pixels in the base image that each represent one electrode. From the identified groups of dark pixels, migration detection unit 26 may determine the center of the groups of dark pixels, which translates to determining the coordinates of the center of each of the electrodes in each lead displayed in the base image. Migration detection unit 26 may then determine the distances between the electrodes using the coordinates of the center of each of the electrodes in each lead displayed in the base image. Migration detection unit 26 may then store the determined distances in memory 32.

In an alternate example, rather than migration detection unit 26 repeating the above steps for each pixel in the base image, the user may select a particular area of interest in the base image. For example, with user interface 30, the user may select an area in the base image that encompasses all of the displayed leads, or at least the leads of interest. Migration detection unit 26 may then determine the distances between the electrodes, as described above, but only repeat the steps for the area that encompasses all of the display leads. In this manner, the amount of calculations performed by migration detection unit 26 may be reduced. Also, in this manner, the false detection of an electrode may be reduced.

The user may then reconstruct a segment in the base image with the comparative image, as described above. For example, the user may place the visualizer generated by visualization unit 24 over one whole lead displayed in the base image. Visualization unit 24 may then reconstruct the segment with the corresponding segment in the comparative image, as described above. Migration detection unit 26 may then determine the distances between the electrodes on the leads, but in this instance, migration detection unit 26 may utilize the electrodes displayed in the reconstructed segment in the base image.

In this example, if the determined distances of the electrodes of the leads, in the reconstructed segment of the base image, are different than the stored distances of the electrodes of the leads, migration detection unit 26 may determine that the leads migrated. Also, migration detection unit 26 may further determine the amount of migration by subtracting the determined distances of the electrodes in the reconstructed segment with the stored distances. In this example, if the determined distances of the electrodes of the leads, in the reconstructed segment of the base image, are the same as the stored distances of the electrodes of the leads, migration detection unit 26 may determine that the leads did not migrate.

Based on the determination of migration detection unit 26, processor 20 may output an indication to the user, with display 34 as one example, indicating whether the leads migrated. In this manner, the user may be able to positively identify lead migration, as well as avoid falsely identifying lead migration. For example, a patient may indicate reduction in the efficacy of therapy, and the user may initially believe that the reduction in efficacy is caused by lead migration. By utilizing one or more of the example techniques described in this disclosure, the user may be able to confirm whether the reduction in efficacy of the therapy is potentially caused by lead migration or by other factors.

In some examples, if the leads migrated, migration detection unit 26 may output the amount by which the leads migrated to processor 20. Processor 20 may recalculate parameters for the electrical stimulation therapy based on the amount of lead migration. Processor 20 may display the recalculated parameters to the user for user confirmation, if user confirmation is desirable. Processor 20 may transmit the recalculated parameters for the electrical stimulation therapy to programmer 14, which may in turn reprogram the therapy delivered by the medical device implanted within the patient. In examples where programmer 14 includes image processing device 16, programmer 14 may change the parameters of the electrical stimulation therapy based on the amount of migration calculated by migration detection unit 26.

As another example, rather than relying on the user to estimate the dissemination of electrical stimulation, image processing device 16 may be configured to estimate the dissemination of the electrical stimulation. For example, to estimate dissemination of electrical stimulation, image processing device 16 may include tissue property determination unit 28 which may be a stand-alone hardware unit, a software unit executing on processor 20, processing circuitry combined with one or more other units of image processing device 16, or a combination thereof.

In this example, the user may move the visualizer to a desired segment in the base image, and visualization unit 24 may reconstruct the segment in the base image with the corresponding segment in the comparative image, which may be a tensor image. Tissue property determination unit 28 may determine properties of the nerve fibers in the reconstructed segment of the base image. For example, tissue property determination unit 28 may determine nerve fiber size, neuronal properties, and other such properties of the reconstructed segment of the base image. Also tissue property determination unit 28 may determine the positions of the implanted leads relative to the tissue displayed in the reconstructed segment.

There may be various techniques with which tissue property determination unit 28 may determine nerve fiber size, neuronal properties, and other such properties of the reconstructed segment of the base image. For example, to acquire a tensor image, imaging source 12 may utilize a diffusion tensor imaging (DTI) technique. The DTI technique may involve the restricted diffusion of water in tissue to acquire a neural tract image, e.g., the tensor image. The tensor image may include a plurality of voxels. A voxel may be a three dimensional pixel in the tensor image. As part of the DTI technique, imaging source 12 may determine attributes for each of the voxels, and store the determined attributes in an image data set for the acquired tensor image. For example, the image data set may include a three dimensional coordinate for each voxel, as well as a color for each voxel. The image data set may also include a rate of electrical stimulation diffusion for each voxel, and a preferred direction of diffusion for each voxel. The attributes stored in the image data set may be based on models for how nerve fibers generally disseminate electrical pulses. The model for how nerve fibers generally disseminate electrical pulses may be based on well known models, models currently being developed, or models to be developed in the future.

Imaging source 12 may transmit the tensor image to image processing device 16, and the corresponding image data set. Tissue property determination unit 28 may utilize the image data set to determine nerve fiber size, and other such properties of the tissue within the reconstructed segment of the base image. For example, tissue property determination unit 28 may determine distances between voxels with the same color, based on the coordinates of the voxels, to determine the nerve fiber size. As another example, tissue property determination unit 28 may utilize the received image data set, for the tensor image, to determine the rate at which the nerve fibers will disseminate electrical therapy, and the direction in which the electrical therapy may disseminate. For example, tissue property determination unit 28 may determine a vector for each voxel within the reconstructed segment of the base image, where the reconstructed segment in the base image came from a comparative image acquired with a tensor imaging modality. The vector may point in the direction of in which the electrical stimulation therapy may disseminate, as indicated by the received image data set. The length of the vector may be based on the rate at which the nerve fibers may disseminate, as indicated by the received image data set.

In examples where image processing device 16 may estimate the dissemination of electrical stimulation, memory 32 may store the received image data set, which may be a model for how nerve fibers generally disseminate electrical pulses. Tissue property determination unit 28 may transmit the determined nerve fiber size, neuronal properties, and other such properties of the reconstructed segment of the base image to processor 20. Processor 20 may then estimate how the electrical stimulation may disseminate along the nerve fibers based on the properties of the nerve fibers determined by tissue property determination unit 28. In some examples, based on the estimation of how the electrical stimulation therapy will disseminate along the nerve fibers, processor 20 may highlight the nerve fibers, estimated to be affected by the electrical stimulation, in the reconstructed segment of the base image. In this manner, the user may be able to better understand how the electrical stimulation will affect tissue such as the nerve fibers given the position of the implanted leads, as one example.

The preceding example is provided for illustration purposes and should not be considered as limiting. For example, aspects of this disclosure are not limited to utilizing the DTI technique to determine nerve fiber properties. Aspects of this disclosure may be extended to a technique that is currently available, or developed in the future, to estimate the manner in which electrical stimulation therapy may disseminate along the nerve fibers.

In general, in some of the preceding examples, by reconstructing the selected segment in the base image with the corresponding segment in the comparative image, visualization unit 24 may show a relationship between the one or more leads implanted within the patient as displayed in the base image with the comparative image. For example, to identify lead migration, the relationship, shown by the reconstructed segment, may show the relationship of the location of one or more implanted leads in the base image and the location of the one or more implanted leads in the reconstructed segment, which is based on the comparative image. The user or migration detection unit 26 may then identify lead migration based on the relationship of the location of the one or more implanted leads in the base image and location of the one or more implanted leads in the reconstructed segment. As another example, to estimate dissemination of electrical therapy, the relationship, shown by the reconstructed segment, may show the relationship of the location of one or more implanted leads in the base image and the tissue of the patient in the reconstructed segment, which is based on the comparative image. The user or tissue property determination unit 28, with processor 20, may then be able to estimate dissemination of electrical therapy based on the location of the one or more implanted leads relative to the tissue displayed in the reconstructed segment.

Figure 3:
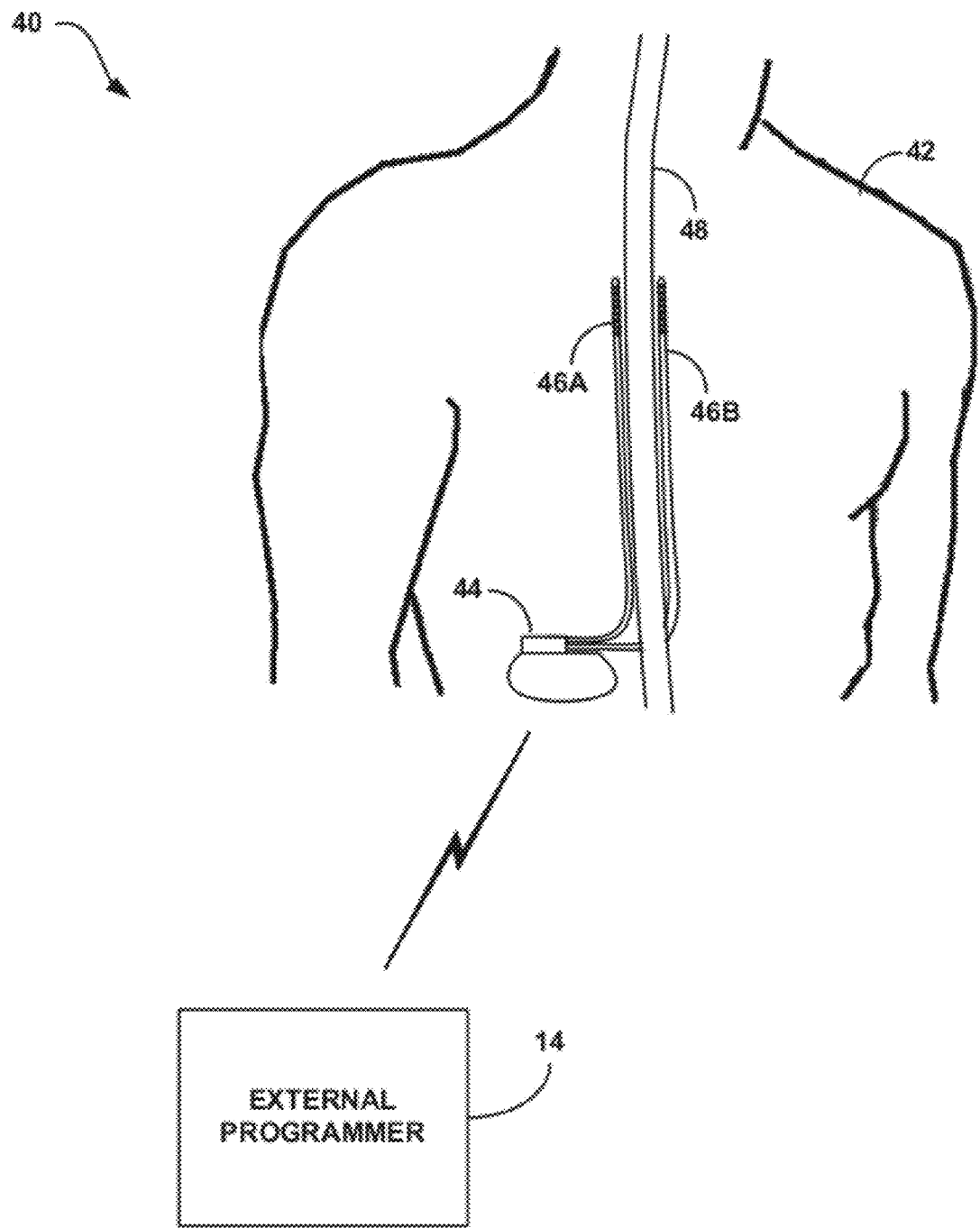
FIG. 3 is a schematic diagram illustrating an implantable stimulation system including a pair of implantable electrode arrays in the form of stimulation leads implanted within a patient.

FIG. 3 is a schematic diagram illustrating an implantable stimulation system 40 including a pair of implantable electrode arrays in the form of stimulation leads 46A, 46B implanted within a patient 42. As shown in FIG. 3, system 40 includes an implantable stimulator 44 and an external programmer 14, similar to programmer 14 of FIG. 1, shown in conjunction with patient 42. Although FIG. 3 shows an implantable stimulator 44 coupled to fully implanted leads 46A, 46B, the techniques described in this disclosure may be applied to external stimulators coupled to leads via percutaneous lead extensions. Implantable stimulator 44 may be one example of an implantable medical device (IMD).

As shown in FIG. 3, leads 46A, 46B are implanted adjacent a spinal cord 48 of patient 42, e.g., for spinal cord stimulation (SCS) to alleviate pain. However, the techniques described in this disclosure are applicable to leads implanted to target any of a variety of target locations within patient 42, such as leads carrying electrodes located proximate to spinal cord 48, pelvic nerves, peripheral nerves, the stomach or other gastrointestinal organs, or within the brain of a patient.

In the example of FIG. 3, stimulation energy is delivered from stimulator 44 to spinal cord 48 of patient 14 via one or more electrodes carried by axial leads 46A and 46B (collectively "leads 46") implanted within the patient. In various applications, such as spinal cord stimulation (SCS), the adjacent implantable leads 46 may have longitudinal axes that are substantially parallel to one another. Various combinations of electrodes carried by the leads 16 may be used to deliver electrical stimulation, including combinations of electrodes on a single lead or combinations of electrodes on both leads. Also, in some examples, electrodes may be carried by paddle leads in which an array of electrodes may be arranged in a two-dimensional pattern, e.g., as columns or rows of electrodes, on a common planar lead surface.

For leads or other electrode arrays, electrodes may be formed as any of a variety of electrodes such as ring electrodes, segmented electrodes, needle electrodes, pad electrodes, or the like. In general, the term "electrode array" may refer to electrodes deployed on axial leads, paddle leads, or other lead configurations. In each case, the imaging techniques described in this disclosure may be useful in identifying lead migration or estimating dissemination of electrical stimulation therapy.

In the example of FIG. 3, leads 46 carry electrodes that are placed adjacent to the target tissue of spinal cord 48. In particular, leads 46 may be implanted in the epidural space adjacent spinal cord 48, and coupled to an implanted stimulator 44. In the example of FIG. 3, stimulation energy may be delivered to spinal cord 48 to eliminate or reduce pain perceived by patient 42. However, the stimulator may be used with a variety of different therapies, such as peripheral nerve stimulation (PNS), peripheral nerve field stimulation (PNFS), deep brain stimulation (DBS), cortical stimulation (CS), pelvic floor stimulation, gastric stimulation, and the like. The stimulation may be configured to alleviate a variety of symptoms or conditions such as chronic pain, tremor, Parkinson's disease, epilepsy, urinary or fecal incontinence, sexual dysfunction, obesity, or gastroparesis. The stimulation delivered by stimulator 44 may take the form of stimulation pulses or continuous waveforms, and may be characterized by controlled voltage levels or controlled current levels, as well as pulse width and pulse rate in the case of stimulation pulses.

The stimulation energy may be delivered via selected combinations of electrodes carried by one or both of leads 46. The target tissue may be any tissue affected by electrical stimulation energy, such as electrical stimulation pulses or waveforms. Such tissue may include nerves, nerve fibers, smooth muscle fiber, and skeletal muscle fiber. In the example illustrated by FIG. 3, the target tissue is spinal cord 48. Stimulation of spinal cord 48 may, for example, prevent pain signals from traveling thorough the spinal cord and to the brain of the patient. Patient 42 may perceive the interruption of pain signals as a reduction in pain and, therefore, efficacious therapy. However, inaccurate or imprecise knowledge of lead position or lead migration and inaccurate or imprecise knowledge of which tissue will be affected by the electrical stimulation can result in delivery of therapy with sub-optimal parameters and insufficient efficacy.

With reference to FIG. 3, a user, such as a clinician, physician or patient 42, may interact with a user interface of external programmer 14 to program stimulator 44. Programming of stimulator 44 may refer generally to the generation and transfer of commands, programs, or other information to control the operation of the stimulator. For example, programmer 14 may transmit programs, parameter adjustments, program selections, group selections, or other information to control the operation of stimulator 44, e.g., by wireless telemetry. Parameter adjustments may refer to initial parameter settings or adjustments to such parameter settings. The parameter settings may include, for each program, pulse current or pulse voltage amplitude, pulse rate, pulse width, electrode combination, electrode polarity, and the like. A program may specify a set of parameters that define stimulation. A group may specify a set of programs that define different types of stimulation, which may be delivered simultaneously using pulses with independent amplitudes or on a time-interleaved basis.

An example of a commercially available clinician programmer is the Medtronic N'Vision® Programmer Model 8840, marketed by Medtronic, Inc., of Minneapolis, Minn. An example of a commercially available patient programmer is the Medtronic myStim® Programmer, marketed by Medtronic, Inc. The examples of the clinician and patient programmer are provided for illustration purposes and should not be considered as limiting. For instance, examples of a clinician programmer and patient programmer may also include programmers that are currently being developed or will be developed in the future. For example, a clinician programmer may be a programmer such as the programmer illustrated in FIG. 6, and, in some examples, may be a programmer such as the programmer illustrated in FIG. 6 that also includes the components of the image processing device 16, as illustrated in FIG. 2.

In some cases, external programmer 14 may be a physician or clinician programmer if it is primarily intended for use by a physician or clinician. In other cases, external programmer 14 may be a patient programmer if it is primarily intended for use by a patient. In general, a physician or clinician programmer may support selection and generation of programs or parameters by a clinician for use by stimulator 44, whereas a patient programmer may support more limited adjustment and selection of such programs or parameters by a patient during ordinary use.

Stimulator 44 may be implanted in patient 42 at a location minimally noticeable to the patient. Alternatively, stimulator may be external to patient 42 and coupled to implanted leads via a percutaneous extension. For spinal cord stimulation (SCS), as an example, stimulator 44 may be located, for example, in the lower abdomen, lower back, or other location to secure the stimulator. Leads 46 may be tunneled from stimulator 44 through tissue to reach the target tissue adjacent to spinal cord 48 for stimulation delivery. At distal portions of leads 46 are one or more electrodes (not shown) that transfer stimulation energy from the lead to the tissue. The electrodes may be electrode pads on a paddle lead, circular (i.e., ring) electrodes, surrounding the body of leads 46, segmented electrodes arranged at different axial and rotational positions around a lead, conformable electrodes, cuff electrodes, or any other type of electrodes capable of forming unipolar, bipolar or multipolar electrode configurations. In general, segmented electrodes arranged at selected axial and rotational positions at the distal ends of leads 46 will be described for purposes of illustration.

In the example of FIG. 3, each of the electrode combinations specifies a combination of electrodes arranged along lengths of two or more leads. If each lead 46 includes four ring electrodes, then the leads can be viewed as having four axial positions or levels. For segmented electrodes, an electrode may occupy a rotational are at a given axial position of the lead. In some cases, the rotational arc may be similar to a portion of a ring electrode. For example, instead of a ring electrode that extends 360 degrees around a lead body, three, separate ninety degree segments could be provided to form three segmented electrodes at a given axial position along the length of the lead. Hence, two or more segmented electrodes may be provided at the same axial position but at different, non-overlapping rotational positions. Alternatively, a single segmented electrode could be provided at each of multiple axial levels. In general, in each case, a segmented electrode or electrode segment may have a dimension that spans only a portion of the circumference of the lead, unlike a ring electrode which generally extends around the entire circumference.

An electrode combination may include combinations of electrodes on the same lead or multiple leads, as well as one or more electrodes on a housing of stimulator 44 in some cases. In each case, some electrodes in an electrode combination may form anodes while other electrodes form cathodes, establishing paths for flow of electrical stimulation current relative to an anatomical target such as spinal cord nerve tissue at a desired position on the spinal cord. As an example, for SCS, stimulation may be delivered in the vicinity of the T7, T8 and T9 vertebrae, although other positions on the spinal cord are possible. In a current-based system, electrodes may be selected to form anodes or cathodes coupled to regulated current sources and sinks, respectively.

External programmer 14 presents an interface that permits modification of a stimulation program by adjustment of parameter values such as voltage or current amplitude, pulse width, pulse rate, electrode combination, and electrode polarity. Adjustments may be desirable in the case of lead migration, accommodation, or disease progression, in which cases a current (i.e., present) stimulation program may no longer be as effective as when the program was initially established. In some examples, analysis of post-implant imagery, as described in this disclosure, may aid the caregiver or an automated programming algorithm in adjusting stimulation parameters to enhance therapeutic efficacy, e.g., to compensate for changes in lead position, sometimes referred to as lead migration, or based on the manner in which the electrical stimulation therapy is estimated to disseminate.

For example, leads 46 may migrate from their implanted locations to other locations. In some examples, image processing device 16 may be configured to determine whether leads 46 migrated, or may be configured to assist the user in visually determining whether leads 46 migrated. Also, as described above, image processing device 16 may be configured to determine parameters for the stimulation therapy based on the amount of migration. In this example, image processing device 16 may transmit the recalculated electrical stimulation therapy parameters to programmer 14, which in turn programs stimulator 44 with the recalculated electrical stimulation therapy parameters.

As another example, the user may not be able to view the manner in which the electrical stimulation disseminates from leads 46 to the tissue of patient 42. In some examples, image processing device 16 may be configured to estimate the manner in which the electrical stimulation therapy disseminates near the tissue of spinal cord 48, or may be configured to assist the user in visually estimating the manner in which the electrical stimulation therapy disseminates near the tissue of spinal cord 48. In this example, based on the manner in which the electrical stimulation therapy disseminates, the user may determine the parameters for the electrical stimulation therapy, and cause programmer 14 to program stimulator 44 with the determined electrical stimulation therapy parameters.

Figure 4:
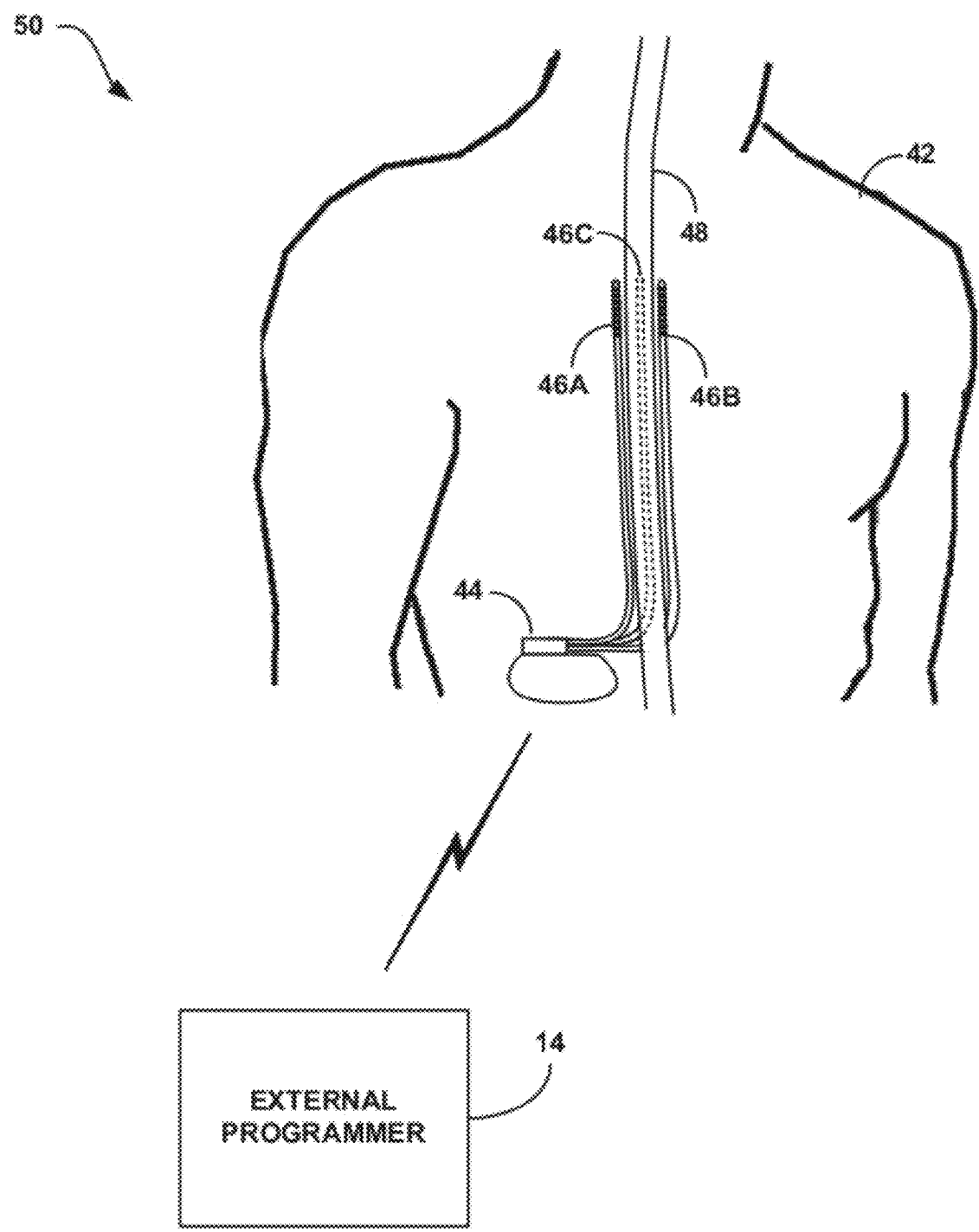
FIG. 4 is a schematic diagram illustrating an implantable stimulation system including a trio of implantable stimulation leads.

FIG. 4 is a schematic diagram illustrating an implantable stimulation system 50 including a trio of implantable stimulation leads 46A, 46B, 46C (collectively leads 46). System 50 generally conforms to system 40 of FIG. 3, but includes a third lead 46C. Accordingly, stimulator 44 may deliver stimulation via combinations of electrodes carried by all three leads 46, or a subset of the three leads. Third lead 46C may reside spatially between leads 46A and 46B. Third lead 46C may include the same number of electrodes as leads 46A and 46B, or a greater number of electrodes than leads 46A and 46B. In the latter case, additional electrodes on lead 46C may be used to form more numerous and more complex electrical stimulation patterns in conjunction with the stimulation electrodes on lead 46A and/or lead 46B. With different electrode counts, sizes, positions and intra-lead electrode spacing among leads 46A, 46B and 46C, as well as variation in relative inter-lead electrode spacing among the leads, lead characterization information can be helpful for effective programming of the electrical stimulation delivered by stimulator 44 via the leads.

Figure 5:
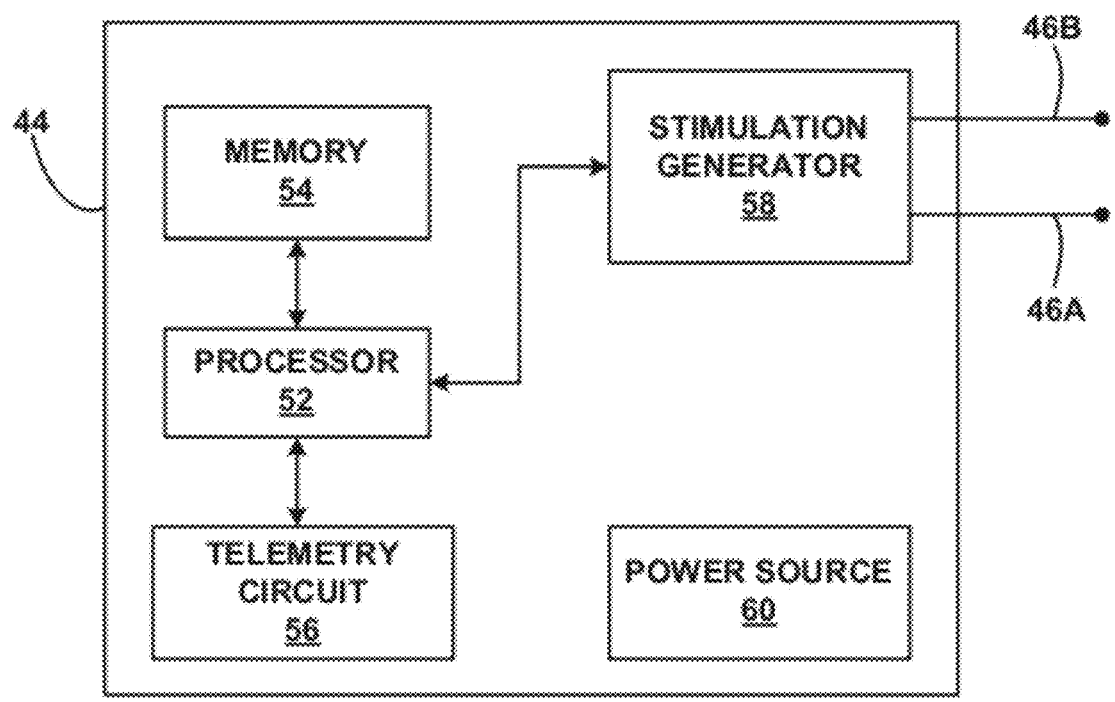
FIG. 5 is a functional block diagram illustrating various components of an implantable stimulator.

FIG. 5 is a functional block diagram illustrating various components of an implantable stimulator 44. In the example of FIG. 5, stimulator 44 includes a processor 52, memory 54, telemetry circuit 56, stimulation generator 58, and power source 60. Memory 54 may store instructions for execution by processor 52, stimulation therapy program data, sensor data, operational and status data, and any other information regarding therapy or patient 42. Stimulation program data may include stimulation parameters transmitted from programmer 14, as well as programs defined by such parameters, and program groups. Some data may be recorded for long-term storage and retrieval by a user. Memory 54 may include separate memories for storing different types of data.

Processor 52 controls stimulation generator 58 to deliver electrical stimulation via electrode combinations formed by electrodes in one or more electrode arrays. For example, stimulation generator 58 may deliver electrical stimulation therapy via electrodes of one or more leads 46, e.g., as stimulation pulses or continuous waveforms. Stimulation generator 58 may include stimulation generation circuitry to generate stimulation pulses or waveforms and switching circuitry to switch the stimulation across different electrode combinations, e.g., in response to control by processor 52. In particular, processor 52 may control the switching circuitry on a selective basis to cause stimulation generator 58 to deliver electrical stimulation to selected electrode combinations and to shift the electrical stimulation to different electrode combinations. Alternatively, in some examples, stimulation generator 58 may include multiple current or voltage sources to control delivery of stimulation energy to selected combinations of electrodes carried by leads 46.

Electrode combinations and other parameters associated with different therapy programs may be represented by data stored in a memory location, e.g., in memory 54, of stimulator 44. Processor 52 may access the memory location to determine the electrode combination for a particular program and control stimulation generator 58 to deliver electrical stimulation via the indicated electrode combination. Each program may specify a set of parameters for delivery of electrical stimulation therapy. As an example, a program may specify electrode combination, electrode polarities, current or voltage amplitude, pulse rate and pulse width. Additional parameters such as duty cycle, duration, and delivery schedule also may be specified by a therapy program.

Using an external programmer, such as programmer 14, a user may select individual programs for delivery on an individual basis, or combinations of programs for delivery on a simultaneous or interleaved basis. In addition, a user may adjust parameters associated with the programs. The programs may be stored in memory 54 of implantable stimulator 44. Alternatively, the programs may be stored in memory associated with external programmer 14. In either case, the programs may be selectable and adjustable to permit modification of therapy parameters. In addition, a physician programmer may permit generation of new programs, which may be loaded into memory 54, and adjustment of parameters associated with existing programs.

Upon selection of a particular program or program group from memory 54, processor 52 may control stimulation generator 58 to deliver stimulation according to the programs in the groups, e.g., simultaneously or on a time-interleaved basis. A group may include a single program or multiple programs, each of which specifies an electrode combination. Again, the electrode combination may specify particular electrodes in a single array or multiple arrays, e.g., on a single lead or among multiple leads.

Stimulator 44 may be responsive to adjustments of programming parameters and electrode configurations by a user via programmer 14. In particular, processor 52 may receive adjustments to program parameters from programmer 14 via telemetry circuit 56. Telemetry circuit 56 may support wireless telemetry with external programmer 14 or another device by radio frequency (RF) communication, proximal inductive interaction of stimulator 44 with external programmer 14, or other techniques. Telemetry circuit 56 may send information to and receive information from external programmer 14 on a continuous basis, at periodic intervals, or upon request from the stimulator or programmer. To support RF communication, telemetry circuit 56 may include appropriate electronic components, such as amplifiers, filters, mixers, encoders, decoders, modulators, demodulators and the like.

Power source 60 delivers operating power to the components of stimulator 44. Power source 60 may include a small rechargeable or non-rechargeable battery and a power generation circuit to produce the operating power. Recharging may be accomplished through proximal inductive interaction between an external charger and an inductive charging coil within stimulator 44. In some examples, power requirements may be small enough to allow stimulator 44 to utilize patient motion and implement a kinetic energy-scavenging device to trickle charge a rechargeable battery. In other examples, traditional no rechargeable batteries may be used for a limited period of time. As a further alternative, an external inductive power supply could transcutaneously power stimulator 44 when needed or desired.

Figure 6:
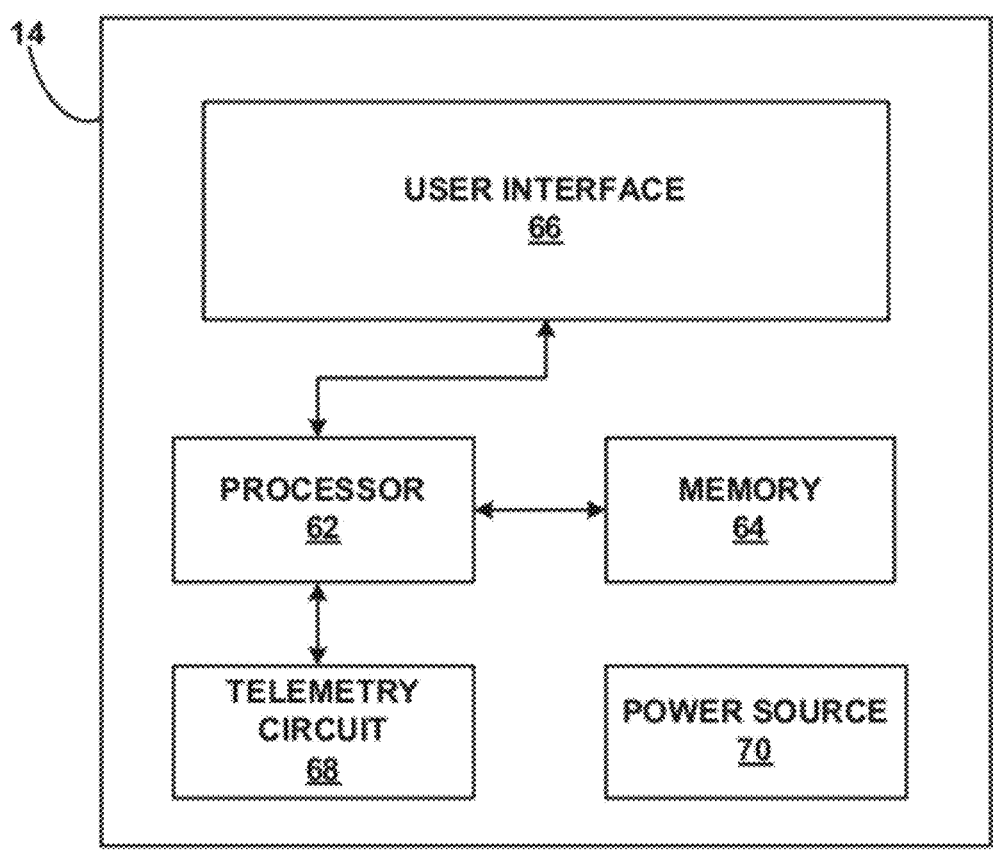
FIG. 6 is a functional block diagram illustrating various components of an external programmer for an implantable stimulator.

FIG. 6 is a functional block diagram illustrating various components of an external programmer 14 for an implantable stimulator 44. As shown in FIG. 6, external programmer 14 includes processor 62, memory 64, telemetry circuit 68, user interface 66, and power source 70. In the case of a clinician programmer, a clinician interacts with user interface 66 in order to generate programs and adjust program parameters, such as voltage or current amplitude, pulse width, pulse rate, electrode combinations and electrode polarities. Generation of programs and adjustment of program parameters may be aided by automated programming algorithms that guide the physician or clinician to select particular programs and program parameters. In the case of a patient programmer, a patient interacts with user interface 66 to select programs and adjust program parameters, e.g., on a limited basis as specified by the physician or clinician. In some examples, programmer 14 may receive adjustments to the program parameters from image processing device 16 to account for lead migration or to account for the estimation of the dissemination of electrical therapy.

As described above, in some example, programmer 14 may perform the functions of image processing device 16 in addition to the functions of programmer 14 described herein. In these examples, programmer 14 may include one or more of the components of image processing device 16 illustrated in FIG. 2. For instance, in these examples, programmer 14 may include one or more of normalization unit 22, visualization unit 24, migration detection unit 26, and tissue property determination unit 28. Also, in these examples, similar units of image processing device 16 and programmer 14 may be formed in a single unit and the single unit may perform the functions of the similar units.

For instance, in these examples, processor 20 of image processing device 16 and processor 62 of programmer 14 may be formed as a single processor, in programmer 14, that is configured to perform the functions of processor 20 and processor 62. Similarly, in these examples, user interface 30 and user interface 66, memory 32 and memory 64, telemetry circuit 36 and telemetry circuit 68, and power source 38 and power source 70 may each be formed as a single unit, respectively, in programmer 14.

User interface 66 may include a screen, such as display 34 of FIG. 2, and one or more input buttons that allow external programmer 14 to receive input from a user. The screen may be a liquid crystal display (LCD), touch screen, or the like. The input buttons may include a touch pad, increase and decrease buttons, emergency shut off button, and other buttons needed to control the stimulation therapy. In some cases, the user may interact with user interface 66 via a stylus, soft keys, hard keys, directional devices, and any of a variety of other input media. Processor 62 receives input from user interface 66, presents data via the user interface, retrieves data from memory 64 and stores data within memory 64. Processor 62 also controls the transmission of data via telemetry circuit 68 to stimulator 44. Memory 64 may include operational instructions for processor 62 or program parameter sets. For example, memory 64 may be a computer-readable storage medium comprising instructions that cause processor 62 to perform various functions.

Telemetry circuit 68 allows the transfer of data to and from stimulator 44. Telemetry circuit 68 may communicate automatically with telemetry circuit 56 of stimulator 44, or telemetry circuit 36 of image processing device 16 at a scheduled time or when the telemetry circuit detects the proximity of the stimulator. Alternatively, telemetry circuit 68 may communicate with stimulator 44 or image processing device 16 when signaled by a user through user interface 66. To support RF communication, telemetry circuit 68 may include appropriate electronic components, such as amplifiers, filters, mixers, encoders, decoders, modulators, demodulators and the like. Power source 70 may be a rechargeable battery, such as a lithium ion or nickel metal hydride battery. Other rechargeable or conventional batteries may also be used. In some cases, external programmer 14 may be used when coupled to an alternating current (AC) outlet, i.e., AC line power, either directly or via an AC/DC adapter.

FIG. 7 is an example of a base image and a comparative image with which a user selects same anatomical points. The example of FIG. 7 may be useful for image processing device 16, or the user to identify lead migration. As described above, in some examples, the user may find it desirable to normalize the coordinates of the base image and the comparative image with normalization unit 22. To normalize the coordinates of the base and comparative images, the user may select the same anatomical points in both the base and comparative image.

For example, as illustrated in FIG. 7, display 34 of image processing device 16 may display base image 72 and comparative image 74 of patient 42. In this example, base image 72 and comparative image 74 were taken with the same imaging modality, e.g., a fluoroscopic imaging modality, to identify lead migration. For instance, the user may have taken base image 72 during or shortly after implantation of leads 46A and 46B in patient 42. The user may have then taken comparative image 74 during a subsequent visit by patient 42.

To normalize the coordinates of base image 72 with the coordinates of comparative image 74, the user, via user interface 30 or display 34, may select one or more anatomical points of patient 42, and in some examples, at least three anatomical points of patient 42. For example, as illustrated in FIG. 7, the user may select anatomical points 76A, 78A, and 80A of patient 42 on base image 72. The user may also select the same anatomical points in comparative image 74. For example, as illustrated in FIG. 7, the user may select anatomical points 76B, 78B, and 80B of patient 42 on comparative image 74.

As shown in FIG. 7, anatomical points 76A and 76B, 78A and 78B, and 80A and 80B are the same anatomical points of patient 42. Normalization unit 22 may determine the coordinates of anatomical points 76A, 78A, and 80A with the coordinate system of base image 72. Similarly, normalization unit 22 may determine the coordinates of anatomical points 76B, 78B, and 80B with the coordinate system of comparative image 74. Because of possible positional differences of imaging source 12 and patient 42 between base image 72 and comparative image 74, the coordinates of anatomical points 76A, 78A, and 80A in base image 72 may be different than the coordinates of anatomical points 76B, 78B, and 80B in comparative image 74 even though anatomical points 76A, 78A, and 80A are the same anatomical points as anatomical points 76B, 78B, and 80B, respectively, of patient 42. Normalization 22 may then calculate one or more transform matrices, as described above, based on the coordinates of anatomical points 76A, 78A, 80A, 76B, 78B, and 80B to normalize base image 72 and comparative image 74.

FIG. 8 is another example of a base image and a comparative image with which a user selects same anatomical points. FIG. 8 may be similar to FIG. 7; however, in the example of FIG. 8, base image 82 and comparative image 84 may be images of patient 42 taken with different imaging modalities. For example, base image 82 may be taken with a fluoroscopic imaging modality, and comparative image 84 may be taken with a tensor imaging modality. The example of FIG. 8 may be useful for image processing device 16, or the user to estimate dissemination of electrical therapy through tissue of patient 42. Similar to FIG. 7, in the FIG. 8, normalization unit 22 may normalize base image 82 and comparative image 84 after the user selects the same anatomical points on base image 82 and comparative image 84.

For example, as illustrated in FIG. 8, the user may select anatomical points 86A, 88A, and 90A on base image 82. The user may also select anatomical points 86B3, 88B, and 90B on comparative image 84. In the example of FIG. 8, anatomical points 86A and 86B, 88A and 883, and 90A and 90B may be the same anatomical points on patient 42.

As described, normalization unit 22 may determine the coordinates of anatomical points 86A, 88A, and 90A on base image 82, and the coordinates of anatomical points 86B, 88B, and 90B on comparative image 84. With the coordinates of each of the anatomical points, normalization unit 22 may calculate one or more transform matrices, as described above, to normalize base image 82 and comparative image 84.

In both the examples of FIGS. 7 and 8, the user may select the three anatomical points on one vertebrae of patient 42 because the chances of one vertebrae moving between patient visits may be minimal. For example, as illustrated in FIG. 7, the user selected anatomical points 76A, 78A, and 80A, and points 76B, 78B, and 80B on the same vertebrae of patient 42. Also as illustrated in FIG. 8, the user selected anatomical points 86A, 88A, and 90A, and points 86B, 88B, and 90B on the same vertebrae of patient 42.

Also, in some examples, the user may select more than three anatomical points of patient 42. In some examples, when selecting the anatomical points, it may be preferable, although not necessary, for the user to not select symmetrical points, e.g., not select four points that form a rectangle, or not select three points that form a straight line. In examples where the user selects three anatomical points, the user may select three anatomical points that form a triangle that is not an isosceles or equilateral triangle.

FIG. 9 is an example of a reconstructed segment in a base image. The example of FIG. 9 may be useful for image processing device 16 or the user to estimate dissemination of electrical therapy through tissue of patient 42. For example, display 34 of image processing device 16 may display base image 92 which may be an image of patient 42 taken with a fluoroscopic imaging modality.

With visualization unit 24, the user may select the size and shape of visualizer 94. In some examples, visualization unit 24 may predefine the size and shape of visualizer 94. The user, with user interface 30 or display 34, may move visualizer 94 to location 96 in base image 92. For example, if the user is interested in estimating the manner in which the electrical stimulation therapy may disseminate near location 96, the user may move visualizer 94 to location 96, as illustrated in FIG. 9.

Visualization unit 24 may reconstruct the segment of base image 92 encompassed by visualizer 94. For example, visualization unit 24 may determine the coordinates in the comparative image that correspond to the coordinates of the segment of base image 92 encompassed by visualizer 94. As one example, visualization unit 24 may utilize the transform matrix calculated by normalization unit 22 to determine the coordinates in the comparative image. To reconstruct, in one example, visualization unit 24 may replace the segment of base image 92 encompassed by visualizer 94 with the corresponding segment in the comparative image. As another example, visualization unit 24 may overlay the segment of base image 92 encompassed by visualizer 94 with the corresponding segment in the comparative image.

For instance, in the example of FIG. 9, the comparative image may be an image of patient 42 taken with a tensor imaging modality. In this example, visualization unit 24 may reconstruct the segment of base image 92, which is a fluoroscopic image, with the corresponding segment of the comparative image, which is a tensor image. For example, visualization unit 24 may incorporate the corresponding segment of the comparative image into base image 92 that is encompassed by visualizer 94. In other words, as illustrated in FIG. 9, reconstructed segment 98 may be the corresponding segment in the comparative image with which visualization unit 24 reconstructed the segment of base image 92 encompassed by visualizer 94.

In some examples, reconstructed segment 98 may assist the user in estimating the dissemination of the electrical stimulation therapy through tissue of patient 42. For example, although not shown in FIG. 9, processor 20 may display, on display 34, the electric field generated by leads 46 for given electrical stimulation parameters. With reconstructed segment 98 and the displayed electric field, the user may be able to estimate the dissemination of the electrical stimulation through the nerve fibers of reconstructed segment 98. For instance, the user may be able to view the locations of leads 46A and 46B in base image 92, and view reconstructed segment 98. The user may then be able to see which tissue, e.g., the nerve fibers shown in reconstructed segment 98, may be affected by the electrical stimulation therapy.

In some alternate examples, image processing device 16 may be configured to estimate the dissemination of the electrical stimulation therapy through tissue of patient 42. For example, tissue property determination unit 28 may analyze reconstructed segment 98 to determine properties of the tissue illustrated in reconstructed segment 98. For instance, tissue property determination unit 28 may determine the nerve fiber size, neuronal properties, and the like of the nerve fibers illustrated in reconstructed segment 98. For example, as described above, tissue property determination unit may utilize the image data set, received from imaging source 12, which corresponds to reconstructed segment 98. For instance, the received image data set may indicate the coordinates of voxels of reconstructed segment 98. From the coordinates, tissue property determination unit 28 may determine the nerve fiber sizes. The received image data set may also include attributes such as rate of electrical dissemination and direction of dissemination. Tissue property determination unit 28 may determine neuronal properties based on the rate of electrical dissemination and direction of dissemination, In these alternate examples, memory 32 may store a model for how electrical stimulation therapy disseminates through nerve tissue for given electrical stimulation parameters and proximity of leads 46A and 46B to the nerve tissue. The model may receive as inputs the properties determined by tissue property determination unit 28. For example, processor 20 may apply the model by inputting the nerve fiber size, neuronal property and the like of the nerve fibers illustrated in reconstructed segment 98. By applying the model, processor 20 may develop an algorithm that estimates the dissemination of the electrical stimulation. The user may then input parameters for the electrical stimulation therapy such as amplitude, pulse width, and pulse rate. Processor 20 may then estimate the dissemination of the electrical stimulation for the given electrical stimulation therapy parameters, and the location of leads 46A and 46B relative to reconstructed segment 98.

In either example, e.g., where the user estimates dissemination of electrical stimulation therapy, or where image processing device 16 estimates dissemination of electrical stimulation therapy for given electrical stimulation therapy parameters, the user may modify the parameters of the electrical stimulation therapy, if the user believes that the parameters are not optimal for addressing the needs of patient 42. Image processing device 16 or the user may repeat the above steps until the user believes that the selected parameters are optimal for addressing the needs of patient 42. In this manner, the user may be able to better estimate the manner in which the electrical stimulation therapy will disseminate, and may be able to more easily select the electrical stimulation therapy parameters.

In some examples, processor 20 may suggest electrical stimulation therapy parameters based on the estimation of the dissemination of the electrical stimulation. The user may then select the parameters suggested by processor 20. The user may then cause programmer 14 to program stimulator 44 with the user-selected or processor 20 suggested electrical stimulation therapy parameters.

FIG. 10 is another example of a reconstructed segment in a base image. The example of FIG. 10 may be useful for image processing device 16 or the user to identify lead migration of leads 46. For example, display 34 of image processing device 16 may display base image 100 which may be an image of patient 42 taken with a fluoroscopic imaging modality.

Similar to FIG. 9, in FIG. 10, with visualization unit 24, the user may select the size and shape of visualizer 102, or visualization unit 24 may predefine the size and shape of visualizer 102. As shown in FIG. 10, the user may move visualizer 102 to location 104 in base image 100. For example, if the user is interested in identifying lead migration of leads 46, the user may move visualizer 102 to a location over one or more of leads 46, such as location 104 illustrated in FIG. 10.

Visualization unit 24 may reconstruct the segment of base image 100 encompassed by visualizer 102. For example, similar to the example of FIG. 9, in FIG. 10, visualization unit 24 may determine the coordinates in the comparative image that correspond to the coordinates of the segment of base image 100 encompassed by visualizer 102. Visualization unit 24 may then reconstruct the segment of base image 100 encompassed by visualizer 102 based on the corresponding segment in the comparative image, as described above, e.g., replace or overlay the segment of base image 100 encompassed by visualizer 102 with the corresponding segment in the comparative image.

For instance, in the example of FIG. 10, the comparative image may be an image of patient 42 taken with a fluoroscopic imaging modality. In this example, visualization unit 24 may reconstruct the segment of base image 100, which is a fluoroscopic image, with the corresponding segment of the comparative image, which is another fluoroscopic image. As illustrated in FIG. 10, reconstructed segment 106 may be the corresponding segment in the comparative image with which visualization unit 24 reconstructed the segment of base image 100 encompassed by visualizer 102.

In some examples, reconstructed segment 106 may assist the user in identifying lead migration in patient 42. For example, as illustrated in reconstructed segment 106, a portion of leads 46A and 46B encompassed by visualizer 102 appear disjointed with the remaining portions of leads 46A and 46B. For instance, the portions of leads 46A and 46B that are encompassed visualizer 102 appear shifted to the right, and do not appear to line up continuously with the remaining portions of leads 46A and 46B. In this example, due to the shift of leads 46A and 46B to the right, the user may determine that leads 46A and 46B migrated between the patient's visit when the base image was acquired and during the current visit when the comparative image is acquired. In this manner, the user may be able to identify lead migration of leads 46.

In some alternate examples, image processing device 16 may be configured to identify lead migration of leads 46. For example, prior to reconstructing the segment of base image 100 encompassed by visualizer 102, migration detection unit 26 may calculate the distances between each of the electrodes of leads 46. For instance, migration detection unit 26 may identify the coordinates of the electrodes of leads 46 in base image 100, and calculate the distances between the electrodes based on the identified coordinates. Migration detection unit 26 may utilize any technique to identify the coordinates of electrodes of leads 46, as described above. Migration detection unit 26 may store the calculated distances of the electrodes in the base image in memory 32.

After visualization unit 24 reconstructs the segment of base image 100 encompassed by visualizer 102 to generate reconstructed segment 106, migration detection unit 26 may identify the coordinates of the electrodes of leads 46 in base image 100 and reconstructed segment 106. Migration detection unit 26 may calculate the distances between the electrodes based on the identified coordinates. After calculating the distances with the electrodes within reconstructed segment 106 and base image 100, migration detection unit 26 may compare the calculated distances with the stored distances. If the calculated and stored distances are the same, migration detection unit 26 may determine that one or more leads 46 did not migrate. However, if the distances are different, migration detection unit 26 may determine that one or more leads 46 migrated.

In either example, e.g., where the user identifies lead migration, or where image processing device 16 identifies lead migration, the user may modify the parameters of the electrical stimulation therapy, if the user believes that the current parameters are not optimal given the lead migration. In this manner, the user may be able to better identify lead migration and modify parameters of the electrical stimulation therapy to address the lead migration.

In some examples, processor 20 may suggest electrical stimulation therapy parameters based on the identified lead migration. For example, processor 20 may determine the amount by which leads 46 migrated based on the comparison of migration detection unit 26. Based on the determined amount of migration, processor 20 may suggest changes to the electrical stimulation therapy parameters to the user. The user may then select the parameters suggested by processor 20. The user may then cause programmer 14 to program stimulator 44 with the user-selected or processor 20 suggested electrical stimulation therapy parameters.

FIGS. 11A and 11B are conceptual diagrams illustrating a process by which the user selects the size and shape of the visualizer generated by visualization unit 24. For example, visualization unit 24 may display, on display 34, shape choices and size choices. In the example of FIGS. 11A and 11B, the shape choices may be a rectangle and a circle for the visualizer generated by visualization unit 24. With display 34 or user interface 30, the user may select one of the displayed shape choices.

In the example of FIG. 11A, the user may have selected the "rectangle" for the shape of the visualizer. When the user selects the rectangle, visualization unit 24 may display size choices such as "length" and "width." With display 34 or user interface 30, the user may enter the desired length and width of the visualizer.

In the example of FIG. 11B, the user may have selected the "circle" of the shape of the visualizer. When the user selects the circle, visualization unit 24 may display size choices such as "radius." With display 34 or user interface 30, the user may enter the desired radius of the visualizer.

The examples of FIGS. 11A and 11B may be extended to other shapes and sizes of the visualizer generated by visualization unit 24. For example, visualization unit 24 may display more shape choices than rectangle and circle, such as different types of polygons. As another example, visualization unit 24 may display more complex shape choices such as checkered patterns. As yet another example, visualization unit 24 may allow the user to create his or her own visualizer shape. In this example, the user may also be able to define the size of the user created visualizer shape.

Figure 12:
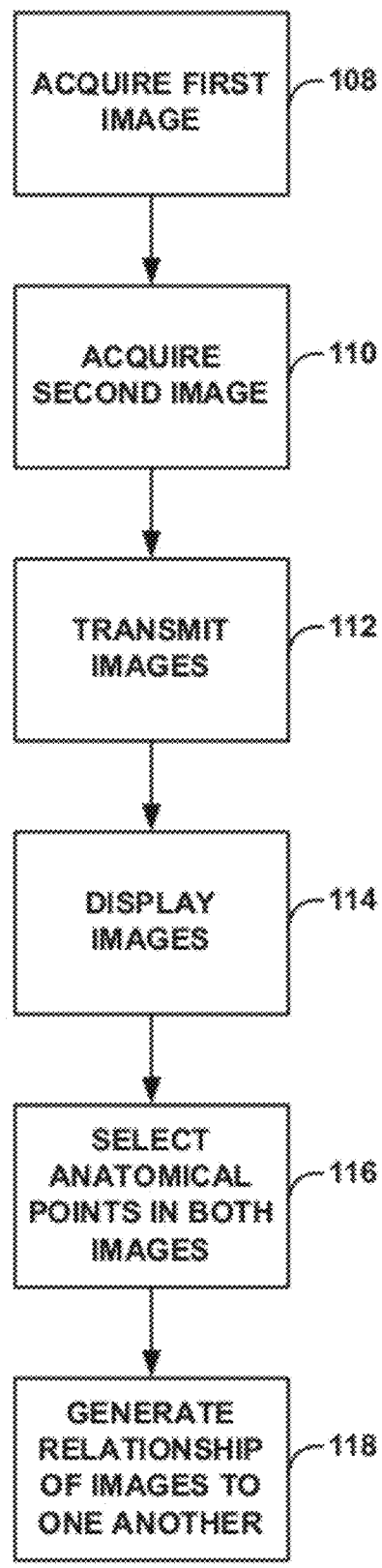
FIG. 12 is a flow chart illustrating an example operation of normalizing a base image and a comparative image.

FIG. 12 is a flow chart illustrating an example operation of normalizing a base image and a comparative image. As described above, normalizing the base and comparative images may resolve any differences in the base and comparative images cause by positional differences of imaging source 12 and patient 42 when taking the base and comparative images. For purposes of illustration only, reference is made to FIGS. 1 and 2.

In the example of FIG. 12, the user may acquire a first image of patient 42 (108). For example, the first image of patient 42 may be the base image. The user may configure imaging source 12 to take an image in a first imaging modality, e.g., a fluoroscopic imaging modality or a tensor imaging modality. The user may acquire a second image of patient 42 (110). For example, the second image of patient 42 may be the comparative image. For the comparative image, the user may configure imaging source 12 to take the comparative image in the same imaging modality as the base image, or in the different imaging modality as the base image.

For example, if the user desires to identify lead migration, the user may take both the base and comparative images with a fluoroscopic imaging modality. In this example, the base and comparative images may be taken at different times. As another example, if the user desires to estimate dissemination of electrical stimulation therapy, the user may take the comparative image with a different imaging modality than the base image, e.g., base image is a fluoroscopic image, and the comparative image is a tensor image. In this example, the base and comparative images may be taken at different times, or at substantially similar times.

Imaging source 12 may transmit the first and second images to image processing device 16 (112). For example, imaging source 12 may transmit the first and second images to image processing device 16 via network 18. As an alternative, imaging source 12 may transmit the first and second images to image processing device 16 via a direct connection or via wireless telemetry. In some examples, imaging source 12 may transmit the first and second images immediately after the user takes the first and second images. In some alternate examples, imaging source 12 may store the first image, and transmit the first and second images after the user takes the second image.

Image processing device 16 may display the first and second images (114). For example, image processing device 16 may display the first and second images on display 34. In some examples, image processing device 16 may display the first and second images side-by-side so that the user can view the first and second images simultaneously.

The user may select anatomical points in both the first and second images (116). In some examples, the selected anatomical points may be the same anatomical points in patient 42. For example, the user may first select anatomical points of patient 42 in the base image. The user may then select the same anatomical points of patient 42 in the comparative image. In some examples, the user may select at least three anatomical points of patient 42 in the base image, and the same three anatomical points of patient 42 in the comparative image.

Normalization unit 22 of image processing device 16 may generate a relationship of the first and second images, e.g., register the first and second images to one another by utilizing an optimization routine (118). For example, normalization unit 22 may determine the coordinates of the selected anatomical points in both the first and second images. With the coordinates of the selected anatomical points in both the first and second images, normalization unit 22 may calculate a transform matrix that establishes a relationship between the coordinates of pixels of the first and second images. For example, normalization unit 22 may determine the values for the transform matrix T described above.

Figure 13:
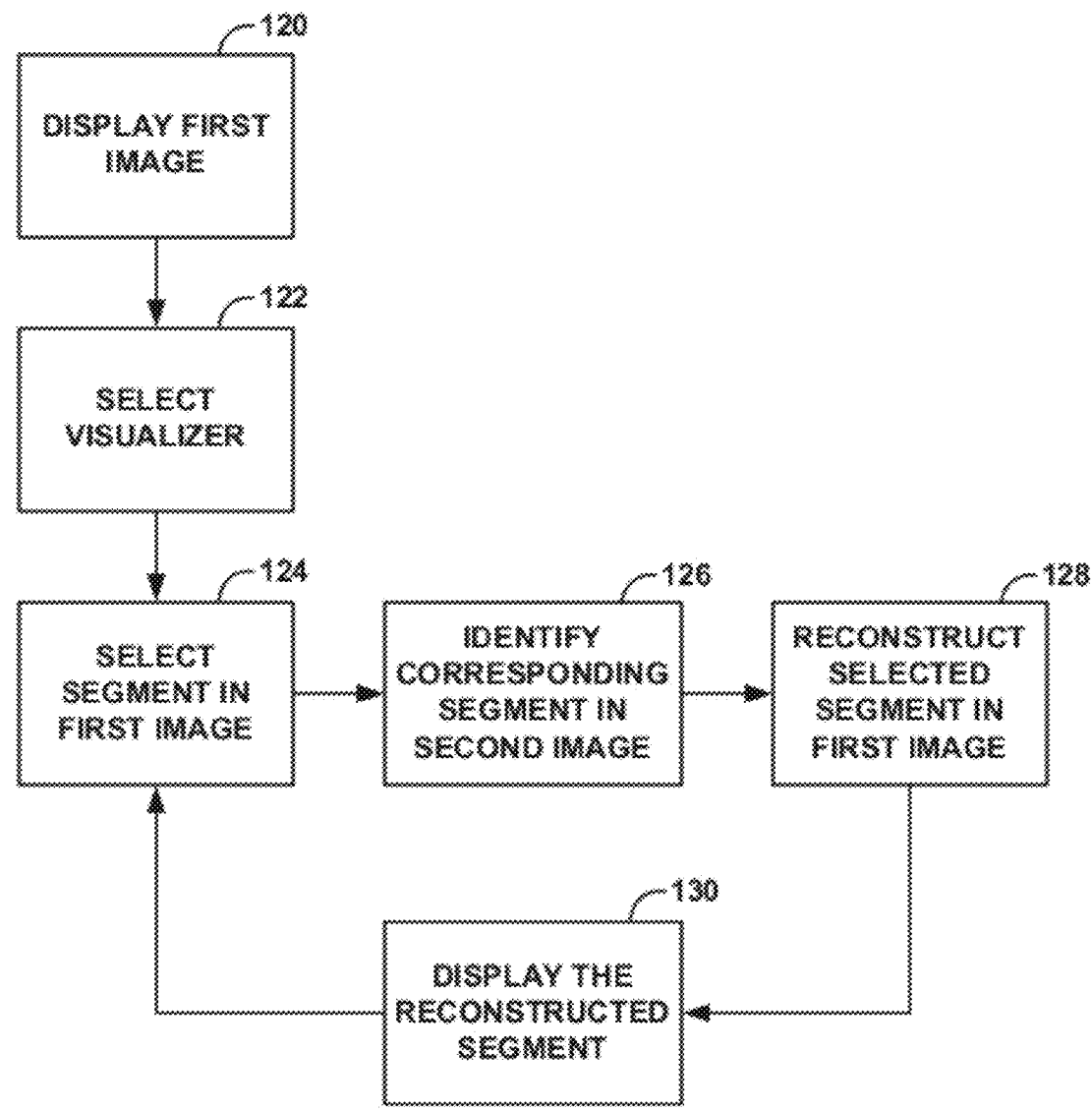
FIG. 13 is a flow chart illustrating an example operation of reconstructing a segment in the base image with a corresponding segment in the comparative image.

FIG. 13 is a flow chart illustrating an example operation of reconstructing a segment in the base image with a corresponding segment in the comparative image. As described above, by reconstructing a segment in the base image with a corresponding segment in the comparative image, the user or image processing device 16 may be able to identify lead migration, or estimate dissemination of electrical stimulation therapy in the tissue of patient 42. For purposes of illustration only, reference is made to FIGS. 1 and 2.

Display 34 may display a first image of patient 42 who is implanted with one or more leads (120). The first image may be the base image. In some examples, visualization unit 24 may allow the user to select the size and shape of the visualizer (122). However, in some alternate examples, the size and shape of the visualizer may be predefined by visualization unit 24, and the user may not be able to select the size and shape of the visualizer.

With display 34 or user interface 30, image processing device 16 may receive a selection for a segment in the first image of patient 42 (124). For example, visualization unit 24 may display the visualizer on display 34. The user may move the visualizer along the first image, and stop on segment in the first image. In this example, by stopping on the segment in the first image, the user may select the segment in the first image. Image processing device 16 may then reconstruct the selected segment as described. As another example, as the user is moving the visualizer, image processing device 16 may repeatedly reconstruct the area encompassed by the visualizer. In this example, the user moving the visualizer may be considered as image processing device 16 receiving a selection for a segment in the first image.

Visualization unit 24 may identify a corresponding segment in a second image (126). The second image may be the comparative image. In some examples, visualization unit 24 may utilize the relationship generated by normalization unit 22 to identify the corresponding segment in the second image. For example, visualization unit 24 may determine the coordinates of the visualizer in the first image. Based on the generated relationship by normalization unit 22, visualization unit 24 may determine the coordinates for a segment in the second image that corresponds to the coordinates of the visualizer in the first image.

Visualization unit 24 may reconstruct the selected segment in the first image with the corresponding segment in the second image (128). For example, visualization unit 24 may replace the selected segment in the first image with the corresponding segment in the second image to reconstruct the selected segment in the first image. As another example, visualization unit 24 may overlay the selected segment in the first image with the corresponding segment in the second image to reconstruct the selected segment in the first image.

Visualization unit 24 may then display the reconstructed segment in the first image (130). For example, the user may see the corresponding segment in the second image as being part of the first image. In this manner, the user may be able to identify lead migration or estimate the dissemination of electrical stimulation therapy for given electrical stimulation therapy parameters. As described above, in some alternate examples, image processing device 16 may be able to identify lead migration or estimate the dissemination of electrical stimulation therapy for given electrical stimulation therapy parameters. The user may then move the visualizer further along the first image to select a segment in the first image (124).

By displaying the reconstructed segment, image processing device 16 may show a relationship between the leads displayed in the first image and the second image. In some examples, the relationship, shown by the reconstructed segment, may be a relationship between a location of the one or more leads displayed in the first image and a location of the one or more leads displayed in the reconstructed segment. Based on this relationship, the user or image processing device 16 may be able to automatically identify lead migration. In some alternate examples, the relationship, shown by the reconstructed segment, may be a relationship of a location of the one or more leads displayed in the first image relative to the tissue of the patient displayed in the reconstructed segment. Based on this relationship, the user or image processing device 16 may be able to estimate a dissemination of electrical stimulation therapy through the tissue of the patient displayed in the reconstructed segment.

The techniques described in this disclosure, including those attributed to image processing device 16, programmer 14, or various constituent components, may be implemented, at least in part, in hardware, software, firmware or any combination thereof. For example, various aspects of the techniques may be implemented within one or more processors including one or more microprocessors, digital signal processors (DSPs), application specific integrated circuits (ASICs), field programmable gate arrays (FPGAs), or any other equivalent integrated or discrete logic circuitry, as well as any combinations of such components in programmers, such as physician or patient programmers, stimulators, image processing devices or other devices. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be instructions on a computer-readable medium such as random access memory (RAM), read-only memory (ROM), non-volatile random access memory (NVRAM), electrically erasable programmable read-only memory (EEPROM), FLASH memory, magnetic data storage media, optical data storage media, or the like. The instructions may be executed to support one or more aspects of the functionality described in this disclosure.

In some examples, the computer-readable medium may be considered as a non-transitory computer-readable storage medium. The term "non-transitory" may indicate that the storage medium is not embodied in a carrier wave or a propagated signal. However, the term "non-transitory" should not be interpreted to mean that the computer-readable storage medium is non-movable. As one example, the computer-readable storage medium may be removed from one device, and moved to another device. As another example, the computer-readable storage medium may be inserted into a device such as image processing device 16. In certain examples, a non-transitory storage medium may store data that can, over time, change (e.g., in RAM).

The techniques described in this disclosure can be applied for implanted leads, and stimulation parameter adjusting and programming, for electrical stimulation systems applicable to any of a wide variety of symptoms or conditions such as chronic pain, tremor, Parkinson's disease, epilepsy, depression, urinary or fecal incontinence, sexual dysfunction, obesity, or gastroparesis. For example, the techniques may be applied to implantable medical devices configured to deliver neurostimulation or other electrical stimulation therapy via implanted electrode arrays, carried by leads or otherwise, located proximate to the spinal cord, pelvic nerves, peripheral nerves, the stomach or other gastrointestinal organs, or within the brain of a patient.

Although examples discussed herein concern reconstructing a selected segment in the first image with a corresponding segment in a second image of a patient implanted with one or more leads, not all embodiments are so limited. For example, a reconstruction can be done in accordance with the subject matter referenced herein to show a relationship between one or more implants displayed in a first image and a second image, wherein the one or more implants are device components other than leads. As such, the subject matter presented herein is applicable to determining the position of any medical device and any part of a medical device, including but not limited to leads. Moreover, the subject matter presented herein is also applicable to analyzing the location and/or movement of anatomical structures (e.g., nerves, bone, and other tissues) and natural formations (e.g., kidney stones, tumors, growths). As such, while analyzing lead location is presented as an exemplar, the methods and devices referenced herein can be applicable to analyzing the positioning of other things, including artificial and/or natural objects within patients. As such, the scope of this disclosure includes receiving a selection, with an image processing device, of a segment in a first image of a patient having an indwelling object, and reconstructing, with the image processing device, the selected segment in the first image with a corresponding segment in a second image of the patient with the indwelling object, wherein the reconstructed segment is configured to show a relationship between the indwelling object displayed in the first image and the second image. All options, features, and circuitry referenced herein are applicable to such embodiments.

Many aspects of the disclosure have been described. Various modifications may be made without departing from the scope of the claims. These and other aspects are within the scope of the following claims.

The invention claimed is:

1. A method comprising:
receiving a selection, with an image processing device, of a segment in a first image of a patient implanted with one or more leads of an implantable medical device;
reconstructing, with the image processing device, the selected segment in the first image with a corresponding segment in a second image of the patient implanted with the one or more leads, wherein the reconstructed segment is configured to show a relationship between the one or more leads in the first image and the second image, wherein the corresponding segment of the second image comprises an image of the one or more leads, and the relationship comprises a relationship between a location of the one or more leads in the first image and a location of the one or more leads in the reconstructed segment; and
automatically identifying, with the image processing device, lead migration of the one or more leads based on the relationship between the location of the one or more leads in the first image and the location of the one or more leads in the reconstructed segment.

2. The method of claim 1, wherein receiving a selection of the segment in the first image comprises receiving a movement of a visualizer along the first image that encompasses an area of the selected segment in the first image.

3. The method of claim 1, wherein reconstructing the selected segment in the first image with the corresponding segment in the second image comprises replacing the selected segment in the first image with the corresponding segment in the second image.

4. The method of claim 1, wherein reconstructing the selected segment in the first image with the corresponding segment in the second image comprises overlaying the corresponding segment in the second image over the selected segment in the first image.

5. The method of claim 1, further comprising:
displaying the first image with the reconstructed segment on a display of the image processing device.

6. The method of claim 1, further comprising:
receiving an identification of one or more anatomical points of the patient in the first image;
receiving an identification of one or more anatomical points in the patient in the second image that are same anatomical points in the patient identified in the first image;
determining coordinates of the identified one or more anatomical points of the patient in the first and second images;
generating a relationship between coordinates of the first and second images based on the determined coordinates of the one or more anatomical points of the patient in the first and second images; and
identifying coordinates for the corresponding segment in the second image based on the generated relationship,
wherein reconstructing the selected segment in the first image with the corresponding segment in the second image comprises reconstructing the selected segment in the first image with the corresponding segment in the second image based on the identified coordinates for the corresponding segment in the second image.

7. The method of claim 1, further comprising:
acquiring the first image with a first imaging modality; and
acquiring the second image with a second imaging modality.

8. The method of claim 7, wherein the first imaging modality and the second imaging modality are a same imaging modality.

9. The method of claim 7, wherein the first imaging modality and the second imaging modality are different imaging modalities.

10. The method of claim 7, wherein acquiring the first image comprises acquiring the first image during a first patient visit, and wherein acquiring the second image comprises acquiring the second image during a second, subsequent patient visit.

11. The method of claim 7, wherein acquiring the first image comprises acquiring the first image during a patient visit, and wherein acquiring the second image comprises acquiring the second image during the patient visit.

12. The method of claim 1, wherein the image processing device comprises a programmer for the implantable medical device.

13. A system comprising:
an apparatus comprising:
a user interface to receive a selection of a segment in a first image of a patient implanted with one or more leads of an implantable medical device; and
processing circuitry configured to:
reconstruct the selected segment in the first image with a corresponding segment in a second image of the patient implanted with the one or more leads, wherein the reconstructed segment is configured to show a relationship between the one or more leads in the first image and the second image, wherein the corresponding segment of the second image comprises an image of the one or more leads, and the relationship comprises a relationship between a location of the one or more leads in the first image and a location of the one or more leads in the reconstructed segment; and
automatically identify lead migration of the one or more leads based on the relationship between the location of the one or more leads in the first image and a location of the one or more lead in the reconstructed segment.

14. The system of claim 13, wherein the user interface receives movement of a visualizer along the first image that encompasses an area of the selected segment in the first image to receive the selection of the segment in the first image.

15. The system of claim 13, wherein the processing circuitry replaces the selected segment in the first image with the corresponding segment in the second image to reconstruct the selected segment in the first image with the corresponding segment in the second image.

16. The system of claim 13, wherein the processing circuitry overlays the corresponding segment in the second image over the selected segment in the first image to reconstruct the selected segment in the first image with the corresponding segment in the second image.

17. The system of claim 13,
wherein the user interface is further configured to:
receive an identification of one or more anatomical points of the patient in the first image; and
receive an identification of one or more anatomical points of the patient in the second image that are same anatomical points in the patient identified in the first image, wherein the processing circuitry is further configured to:
determine coordinates of the identified one or more anatomical points of the patient in the first and second images;
generate a relationship between coordinates of the first and second images based on the determined coordinates of the one or more anatomical points of the patient in the first and second images;
identify coordinates for the corresponding segment in the second image based on the generated relationship; and
reconstruct the selected segment in the first image with the corresponding segment in the second image based on the identified coordinates for the corresponding segment in the second image.

18. The system of claim 13, further comprising at least one imaging source configured to acquire the first image with a first imaging modality, and to acquire the second image with a second imaging modality.

19. The system of claim 18, wherein the first imaging modality and the second imaging modality are a same imaging modality.

20. The system of claim 18, wherein the first imaging modality and the second imaging modality are different imaging modalities.

21. The system of claim 18, wherein the at least one imaging source acquires the first image during a first patient visit, and acquires the second image during a second, subsequent patient visit.

22. The system of claim 18, wherein the at least one imaging source acquires the first image during a patient visit, and acquires the second image during the patient visit.

23. The system of claim 13, wherein the apparatus comprises an image processing device.

24. The system of claim 13, wherein the apparatus comprises a programmer for the implantable medical device.

25. The system of claim 13, further comprising the implantable medical device.

26. The system of claim 13, further comprising the implantable medical device and a programmer, wherein the programmer comprises the apparatus.

27. The system of claim 13, wherein the apparatus further comprises a display configured to display the first image with the reconstructed segment.

28. A non-transitory computer-readable storage medium comprising instructions that cause one or more processors in an image processing device to:
receive a selection of a segment in a first image of a patient implanted with one or more leads of an implantable medical device; and
reconstruct the selected segment in the first image with a corresponding segment in a second image of the patient implanted with the one or more leads, wherein the reconstructed segment is configured to show a relationship between the one or more leads in the first image and the second image, wherein the corresponding segment of the second image comprises an image of the one or more leads, and the relationship comprises a relationship between a location of the one or more leads in the first image and a location of the one or more leads in the reconstructed segment; and
automatically identify lead migration of the one or more leads based on the relationship between the location of the one or more leads in the first image and the location of the one or more leads in the reconstructed segment.

29. An apparatus comprising:
means for receiving a selection of a segment in a first image of a patient implanted with one or more leads of an implantable medical device; and
means for reconstructing the selected segment in the first image with a corresponding segment in a second image of the patient implanted with the one or more leads, wherein the reconstructed segment is configured to show a relationship between the one or more leads in the first image and the second image, wherein the corresponding segment of the second image comprises an image of the one or more leads, and the relationship comprises a relationship between a location of the one or more leads in the first image and a location of the one or more leads in the reconstructed segment; and
means for automatically identifying lead migration of the one or more leads based on the relationship between the location of the one or more leads in the first image and the location of the one or more leads in the reconstructed segment.

30. A method comprising:
receiving a selection, with an image processing device, of a segment in a first image of a patient implanted with one or more leads of an implantable medical device;
reconstructing, with the image processing device, the selected segment in the first image with a corresponding segment in a second image of the patient implanted with the one or more leads, wherein the reconstructed segment is configured to show a relationship between the one or more leads in the first image and the second image, wherein the second image comprises an image of tissue of the patient, and the relationship comprises a relationship of a location of the one or more leads relative to the tissue of the patient in the reconstructed segment; and
automatically estimating, with the image processing device, a dissemination of electrical stimulation therapy through the tissue of the patient based on the relationship of the location of the one or more leads relative to the tissue of the patient in the reconstructed segment.

31. The method of claim 30, wherein receiving a selection of the segment in the first image comprises receiving a movement of a visualizer along the first image that encompasses an area of the selected segment in the first image.

32. The method of claim 30, wherein reconstructing the selected segment in the first image with the corresponding segment in the second image comprises replacing the selected segment in the first image with the corresponding segment in the second image.

33. The method of claim 30, wherein reconstructing the selected segment in the first image with the corresponding segment in the second image comprises overlaying the corresponding segment in the second image over the selected segment in the first image.

34. The method of claim 30, further comprising:
displaying the first image with the reconstructed segment on a display of the image processing device.

35. The method of claim 30, further comprising:
receiving an identification of one or more anatomical points of the patient in the first image;
receiving an identification of one or more anatomical points in the patient in the second image that are same anatomical points in the patient identified in the first image;
determining coordinates of the identified one or more anatomical points of the patient in the first and second images;

generating a relationship between coordinates of the first and second images based on the determined coordinates of the one or more anatomical points of the patient in the first and second images; and identifying coordinates for the corresponding segment in the second image based on the generated relationship, wherein reconstructing the selected segment in the first image with the corresponding segment in the second image comprises reconstructing the selected segment in the first image with the corresponding segment in the second image based on the identified coordinates for the corresponding segment in the second image.

36. The method of claim 30, further comprising:
acquiring the first image with a first imaging modality; and
acquiring the second image with a second imaging modality.

37. The method of claim 36, wherein the first imaging modality and the second imaging modality are different imaging modalities.

38. The method of claim 36, wherein acquiring the first image comprises acquiring the first image during a first patient visit, and wherein acquiring the second image comprises acquiring the second image during a second, subsequent patient visit.

39. The method of claim 36, wherein acquiring the first image comprises acquiring the first image during a patient visit, and wherein acquiring the second image comprises acquiring the second image during the patient visit.

40. The method of claim 30, wherein the image processing device comprises a programmer for the implantable medical device.

41. A system comprising:
an apparatus comprising:
  a user interface to receive a selection of a segment in a first image of a patient implanted with one or more leads of an implantable medical device; and
  processing circuitry configured to:
    reconstruct the selected segment in the first image with a corresponding segment in a second image of the patient implanted with the one or more leads, wherein the reconstructed segment is configured to show a relationship between the one or more leads in the first image and the second image, wherein the second image comprises an image of tissue of the patient, and the relationship comprises a relationship of a location of the one or more leads relative to the tissue of the patient in the reconstructed segment; and
    automatically estimate a dissemination of electrical stimulation therapy through the tissue of the patient based on the relationship of the location of the one or more leads relative to the tissue of the patient in the reconstructed segment.

42. The system of claim 41, wherein the user interface is configured to receive movement of a visualizer along the first image that encompasses an area of the selected segment in the first image to receive the selection of the segment in the first image.

43. The system of claim 41, wherein the processing circuitry is configured to replace the selected segment in the first image with the corresponding segment in the second image to reconstruct the selected segment in the first image with the corresponding segment in the second image.

44. The system of claim 41, wherein the processing circuitry is configured to overlay the corresponding segment in the second image over the selected segment in the first image to reconstruct the selected segment in the first image with the corresponding segment in the second image.

45. The system of claim 41, wherein the user interface is further configured to:
receive an identification of one or more anatomical points of the patient in the first image; and
receive an identification of one or more anatomical points of the patient in the second image that are same anatomical points in the patient identified in the first image,
wherein the processing circuitry is further configured to:
determine coordinates of the identified one or more anatomical points of the patient in the first and second images;
generate a relationship between coordinates of the first and second images based on the determined coordinates of the one or more anatomical points of the patient in the first and second images;
identify coordinates for the corresponding segment in the second image based on the generated relationship; and
reconstruct the selected segment in the first image with the corresponding segment in the second image based on the identified coordinates for the corresponding segment in the second image.

46. The system of claim 41, further comprising at least one imaging source configured to acquire the first image with a first imaging modality, and to acquire the second image with a second imaging modality.

47. The system of claim 46, wherein the first imaging modality and the second imaging modality are different imaging modalities.

48. The system of claim 41, wherein the apparatus comprises an image processing device.

49. The system of claim 41, wherein the apparatus comprises a programmer for the implantable medical device.

50. The system of claim 41, further comprising the implantable medical device.

51. The system of claim 41, further comprising the implantable medical device and a programmer, wherein the programmer comprises the apparatus.

52. The system of claim 41, wherein the apparatus further comprises a display configured to display the first image with the reconstructed segment.

53. A non-transitory computer-readable storage medium comprising instructions that cause one or more processors in an image processing device to:
receive a selection of a segment in a first image of a patient implanted with one or more leads of an implantable medical device; and
reconstruct the selected segment in the first image with a corresponding segment in a second image of the patient implanted with the one or more leads, wherein the reconstructed segment is configured to show a relationship between the one or more leads in the first image and the second image, wherein the second image comprises an image of tissue of the patient, and the relationship comprises a relationship of a location of the one or more leads relative to the tissue of the patient in the reconstructed segment; and
automatically estimate a dissemination of electrical stimulation therapy through the tissue of the patient based on the relationship of the location of the one or more leads relative to the tissue of the patient in the reconstructed segment.

54. An apparatus comprising:
means for receiving a selection of a segment in a first image of a patient implanted with one or more leads of an implantable medical device; and means for reconstructing the selected segment in the first image with a corresponding segment in a second image of the patient implanted with the one or more leads, wherein the reconstructed segment is configured to show a relationship between the one or more leads in the first image and the second image, wherein the second image comprises an image of tissue of the patient, and the relationship comprises a relationship of a location of the one or more leads relative to the tissue of the patient in the reconstructed segment; and means for automatically estimating a dissemination of electrical stimulation therapy through the tissue of the patient based on the relationship of the location of the one or more leads relative to the tissue of the patient in the reconstructed segment.

* * * * *